(12) United States Patent
Lee et al.

(10) Patent No.: US 8,070,050 B2
(45) Date of Patent: Dec. 6, 2011

(54) HEAT CONDUCTING APPARATUS AND SOLDER MELTING METHOD THEREFOR

(75) Inventors: Chia-Hsien Lee, Taipei Hsien (TW); Hao-Chun Hsieh, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 3 days.

(21) Appl. No.: 12/702,938

(22) Filed: Feb. 9, 2010

(65) Prior Publication Data
US 2011/0079634 A1    Apr. 7, 2011

(30) Foreign Application Priority Data
Oct. 7, 2009    (TW) .............................. 98133986 A

(51) Int. Cl.
*B23K 1/018* (2006.01)
(52) U.S. Cl. ..................................................... 228/264
(58) Field of Classification Search ................. 228/178, 228/179.1, 180.1, 180.21, 180.22, 245–255, 228/4.1–6.2
See application file for complete search history.

(56) References Cited

U.S. PATENT DOCUMENTS

| | | | | |
|---|---|---|---|---|
| 2,807,432 A | * | 9/1957 | Parker et al. | 251/150 |
| 5,516,030 A | * | 5/1996 | Denton | 228/180.22 |
| 6,264,094 B1 | * | 7/2001 | Cox et al. | 228/180.21 |
| 2010/0155460 A1 | * | 6/2010 | Mehta | 229/103.11 |

FOREIGN PATENT DOCUMENTS
WO    WO 2006087731 A1 *   8/2006
* cited by examiner

*Primary Examiner* — David Sample
*Assistant Examiner* — Megha Mehta
(74) *Attorney, Agent, or Firm* — Brinks Hofer Gilson & Lione

(57) ABSTRACT

A heat conducting apparatus includes an air guide hood and a heat conducting device. The air guide hood is connected to a hot air supply source for delivering hot air, and includes an air outlet for exit of the hot air. The heat conducting device is disposed at the air outlet of the air guide hood, and includes a contact wall spaced apart from and disposed below the air outlet for contacting a soldered component, and a surrounding wall extending upwardly from the contact wall and connected to the air guide hood. The contact wall and the surrounding wall cooperatively define a space for guiding the hot air. The contact wall conducts the heat to the soldered component so as to melt tin solders between the soldered component and a circuit board, thereby reducing any adverse effect on other electronic components or good chips on the circuit board.

16 Claims, 31 Drawing Sheets

81

Heating a heat conducting device in contact with a soldered component so that the heat conducting device conducts the heat to the soldered component to melt tin solders between the soldered component and a circuit board

82

Removing the soldered component so as to separate the soldered component from the circuit board

F I G. 8

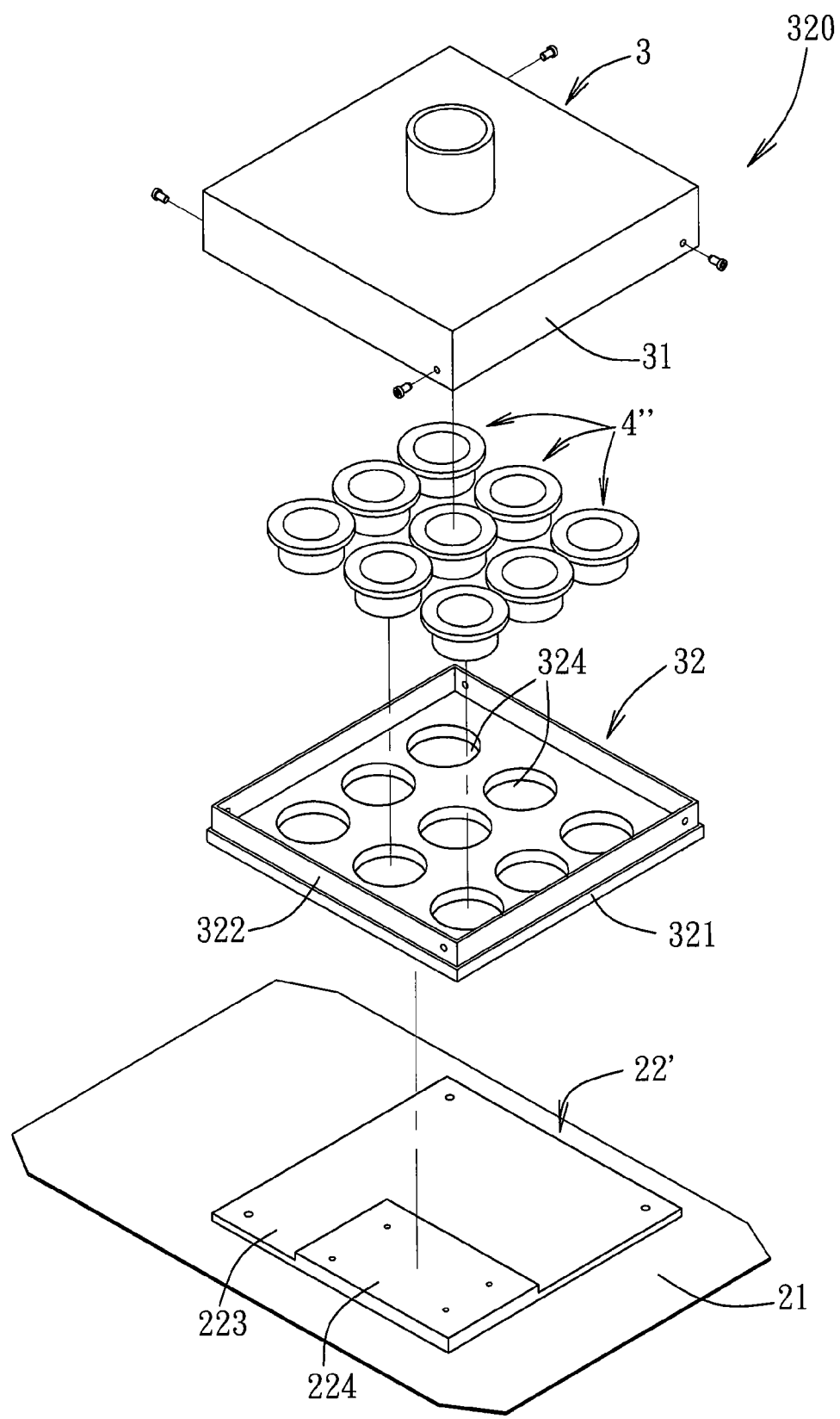
F I G. 20

91 — Bending flexible tubes such that the flexible tubes are disposed at positions corresponding to the tin solders between the circuit board and the soldered component 92 — Delivering hot air, and causing the hot air to be guided by the flexible tubes to flow to the tin solders so as to melt the tin solders 93 — Removing the soldered component so as to separate the soldered component from the circuit board

FIG. 24

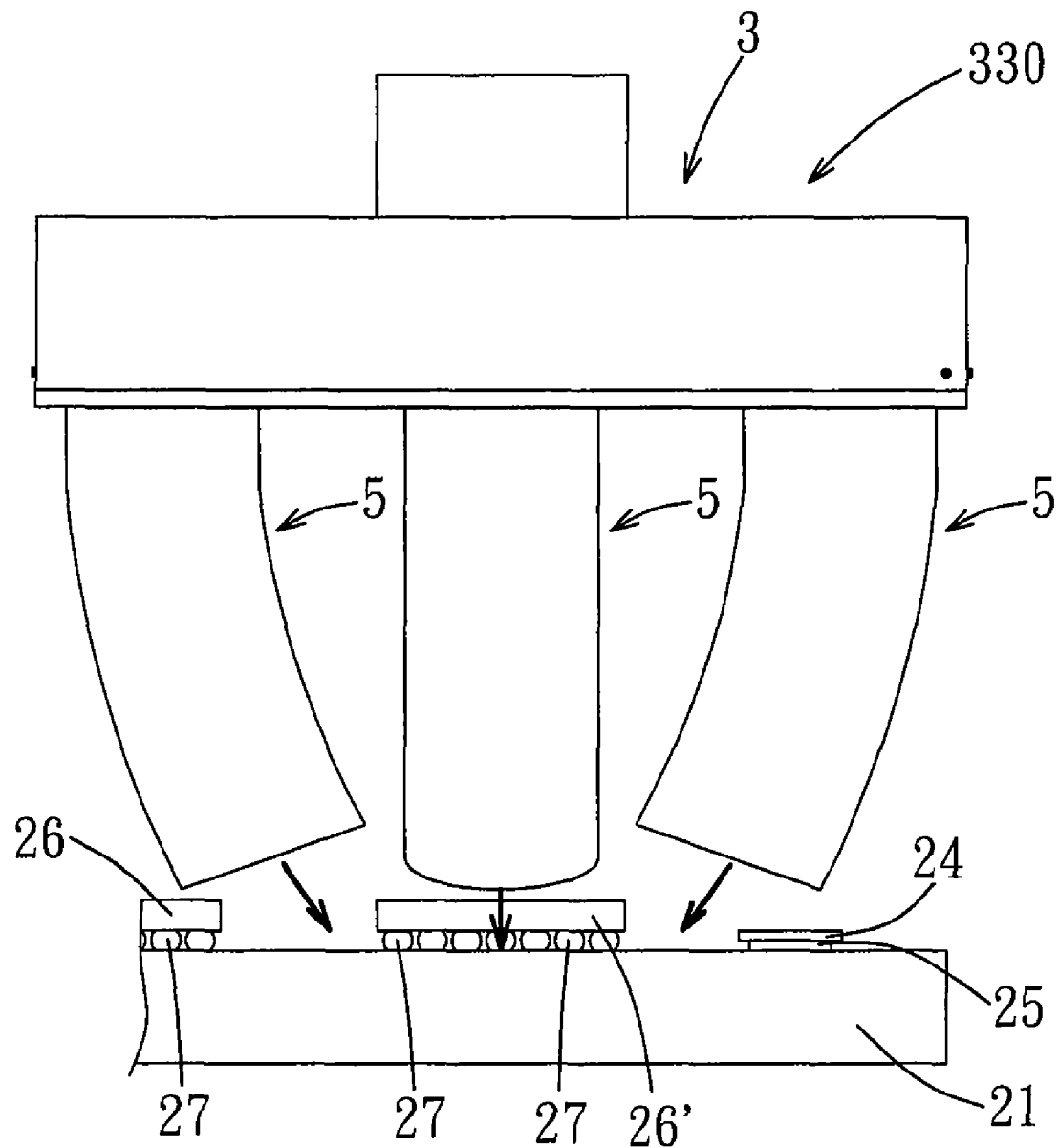
F I G. 27

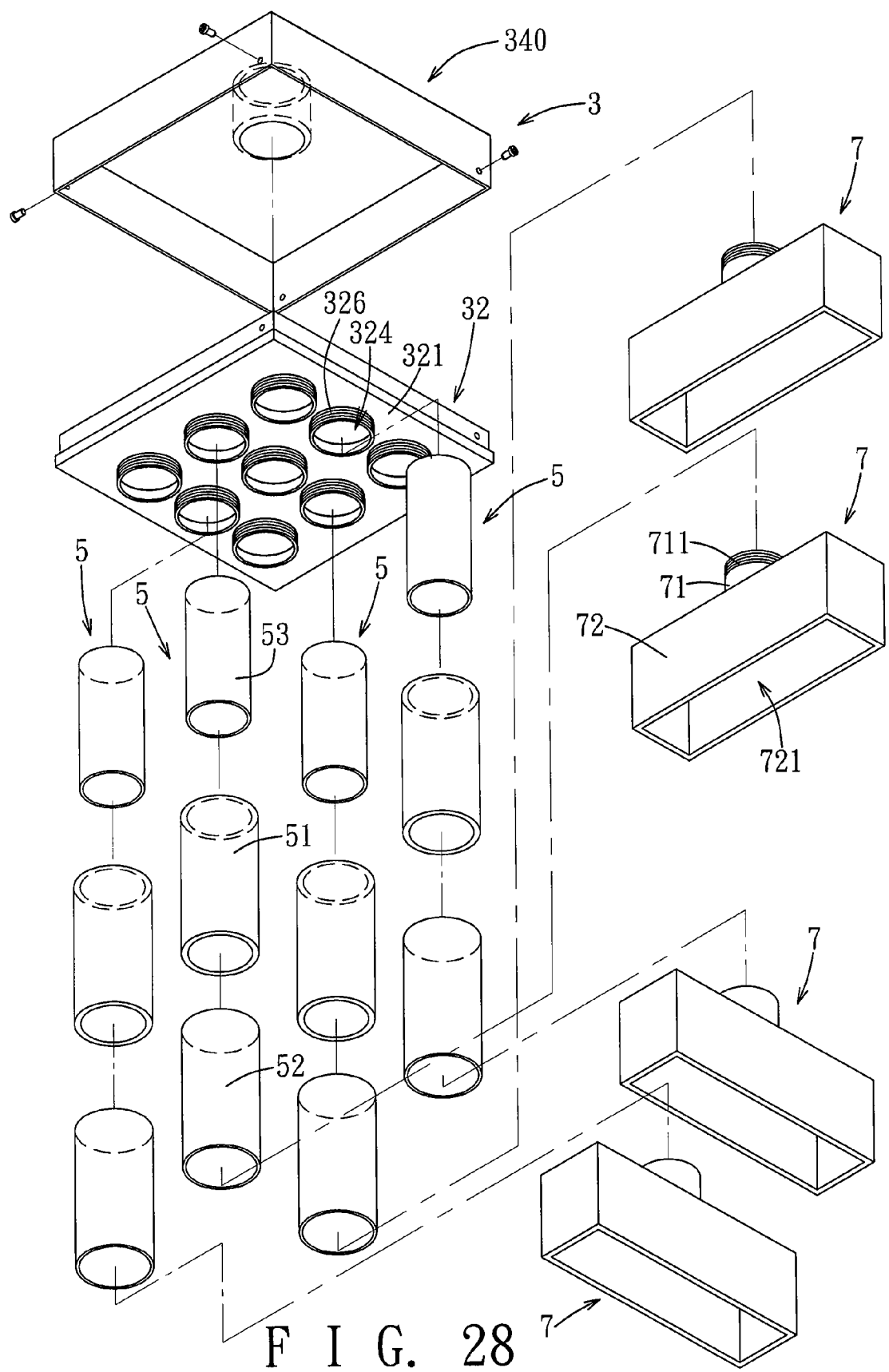
F I G. 28

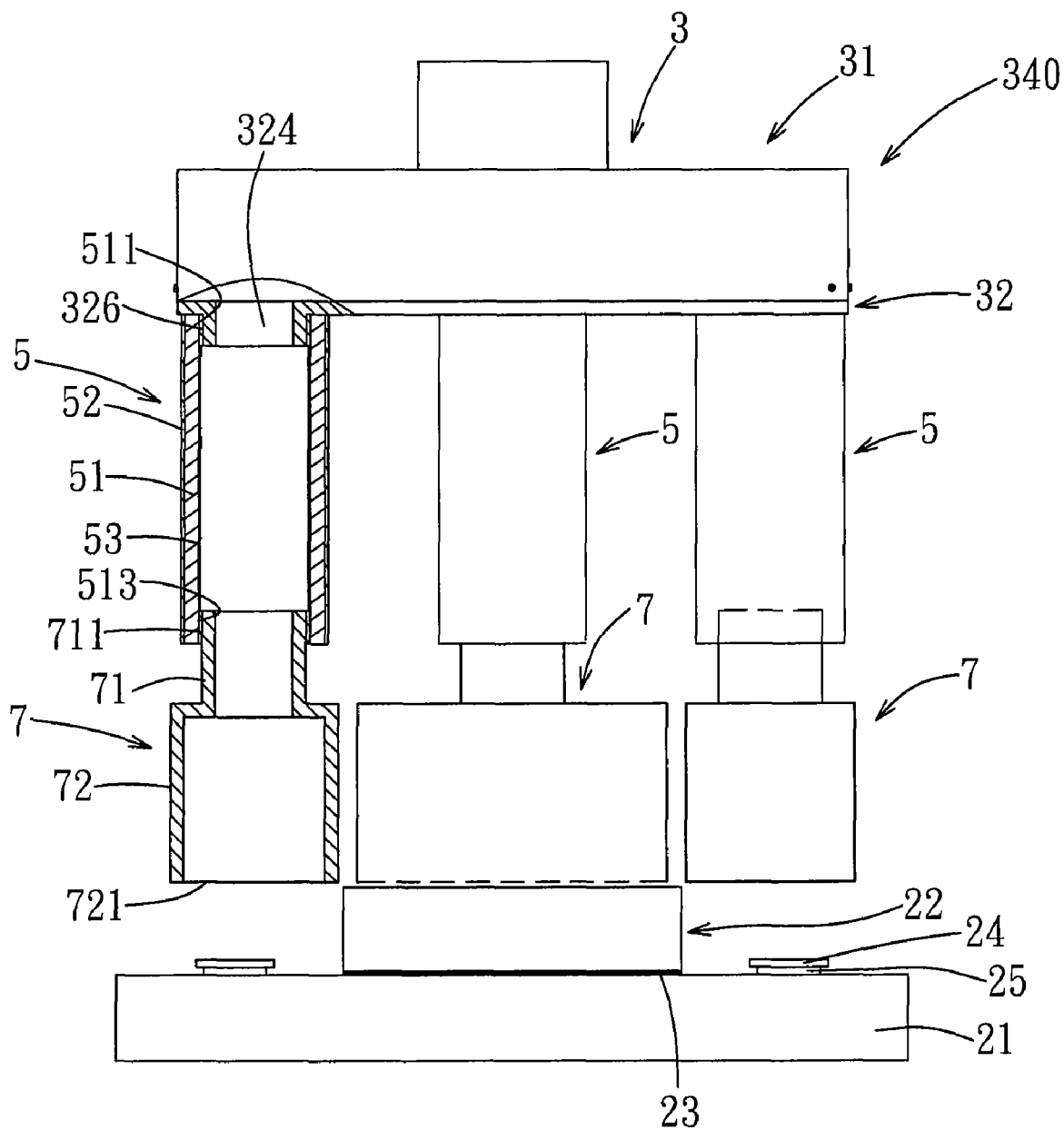
F I G. 29

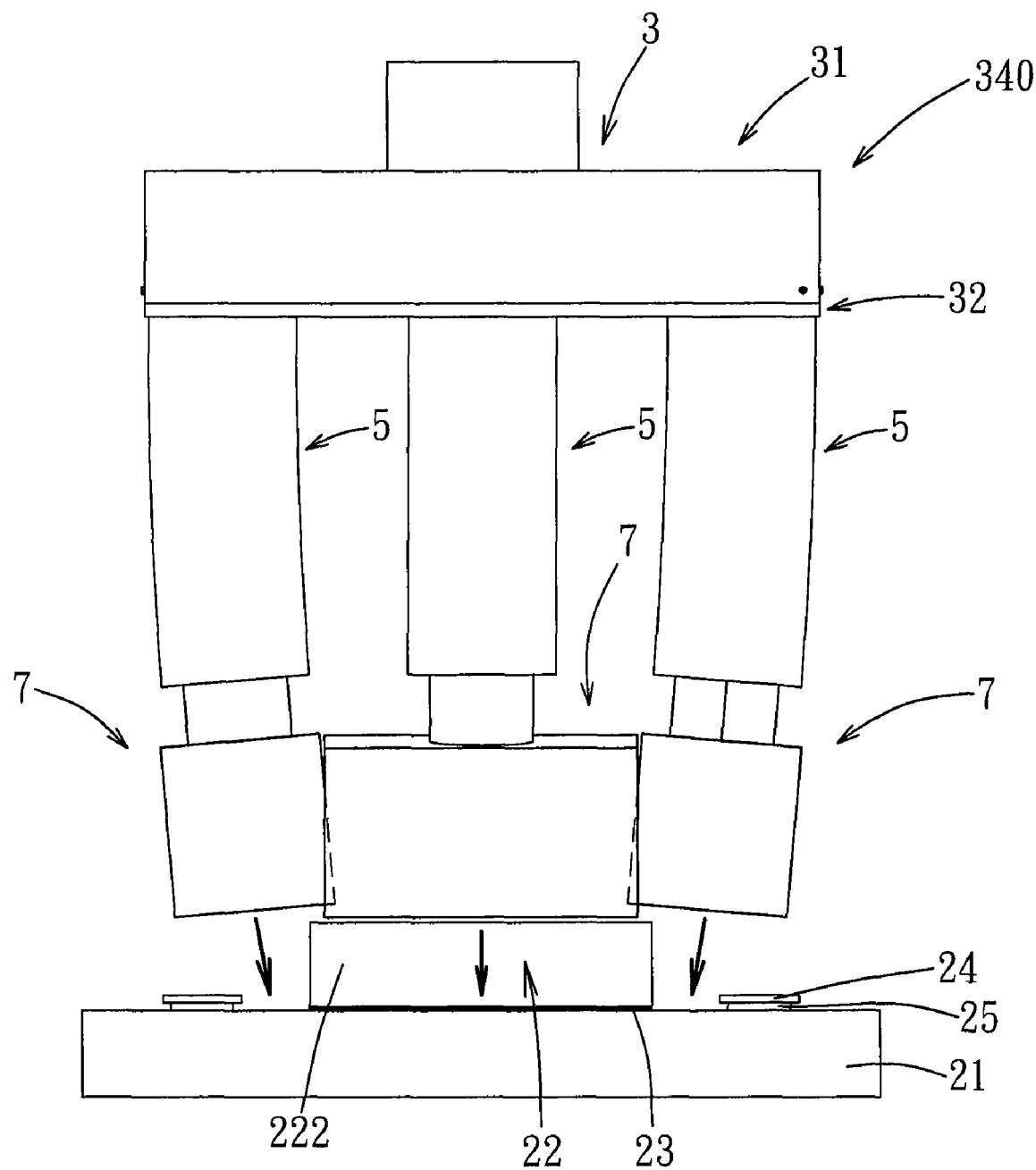
F I G. 30

HEAT CONDUCTING APPARATUS AND SOLDER MELTING METHOD THEREFOR

CROSS-REFERENCE TO RELATED APPLICATION

This application claims priority of Taiwanese Application No. 098133986, filed on Oct. 7, 2009.

BACKGROUND OF THE INVENTION

1. Field of the Invention

The invention relates to a heat conducting apparatus and a solder melting method, more particularly to a heat conducting apparatus for heating and melting solders between a soldered component and a circuit board through heat conduction or flow guiding, and a solder melting method for the apparatus.

2. Description of the Related Art

Referring to FIGS. 1 and 2, a circuit board 11 of a handheld electronic device (not shown), such as a mobile phone, a personal digital assistant, etc., generally has ball grid array (BGA) chips 12 soldered thereon. In order to conduct a rework operation on a chip 12' to be repaired, a conventional rework machine (not shown) employs a hot air convection method to heat and melt solder balls 121 disposed between the chip 12' and the circuit board 11, so that the chip 12' can be removed for subsequent repair or replacement.

Since the circuit board 11 of the handheld electronic device has metal shells 13 soldered thereto to cover the chips 12, 12' for shielding electromagnetic waves, the rework machine needs to melt solder pastes 131 disposed between the corresponding metal shell 13 and the circuit board 11 using the hot air convection method, so that the corresponding metal shell 13 can be removed to allow the subsequent rework operation on the chip 12' to be repaired to proceed. However, during the process of causing hot air flowing out of an air outlet 141 of an air guide device 14 of the rework machine to heat the corresponding metal shell 13, the hot air may be blocked by the metal shell 13 or the circuit board 11 and change direction, so that electronic components 151 around the metal shell 13 and solder pastes 152 on the electronic components 151 may be heated by the hot air and become melted. Furthermore, some of the hot air may flow into the interior of the metal shell 13 via air vents 132 in a top end of the metal shell 13, which may lead to melting of the solder balls 121 of the chips 12, 12' and the solder pastes 131 of the metal shell 13.

Referring to FIG. 3, in order that the convection range of the hot air from the rework machine can match the size of the chip 12' to be repaired, a current approach is to design air guide devices having different sizes of air outlets for different sizes of chips, so that the air guide device can be replaced with one having a suitably sized air outlet to match the size of the chip 12' to be repaired, thereby reducing the effect of the hot air on the other electronic components 151 or the good chips 12 during the rework process. However, this approach will increase the design and manufacturing costs of the air guide device considerably, which in turn will increase the cost of rework operations. Furthermore, since the hot air flowing out of the air outlet 141 (see FIG. 1) of the air guide device 14 is set to blow downwardly to the chip 12', the blowing angle of the hot air is not adjustable. Therefore, the hot air will be blocked by the chip 12' or the circuit board 11 and change direction, so that the electronic components 151 or the good chips 12 may be heated by the hot air, which may lead to melting of the electronic components 151 and the chips 12 or melting of the solder pastes 152 and the solder balls 121 of the chips 12, thereby resulting in loosening of the electronic components 151 and the chips 12. In more serious cases, the tiny electronic components 151 and the chips 12 may be blown away by the hot air and be lost, thereby lowering the rework quality.

SUMMARY OF THE INVENTION

A primary object of this invention is to provide a heat conducting apparatus that conducts heat to a soldered component through heat conduction so as to heat and melt tin solders between the soldered component and a circuit board, thereby reducing any adverse effect on other electronic components or good chips on the circuit board.

Another object of the present invention is to provide a heat conducting apparatus that includes a flexible device which can be bent and disposed at an adjusted angular position to guide hot air to tin solders between a soldered component and a circuit board so as to heat and melt the tin solders, thereby reducing any adverse effect on other electronic components or good chips on the circuit board.

Still another object of the present invention is to provide a solder melting method for a heat conducting apparatus, in which heat is conducted to a soldered component via heat conduction to heat and melt tin solders between the soldered component and a circuit board.

Yet another object of the present invention is to provide a solder melting method for a heat conducting apparatus, in which hot air is guided to flow to tin solders between a soldered component and a circuit board so as to heat and melt the tin solders through a flexible device that can be bent and disposed at an adjusted angular position.

The objects of the present invention and solutions to the problems of the aforementioned prior art can be realized using the technical means to be described below. According to one aspect, the heat conducting apparatus of the present invention is suitable for hot-melting tin solders between a circuit board and a soldered component. The heat conducting apparatus includes an air guide hood and at least one heat conducting device.

The air guide hood is to be connected to a hot air supply source for delivering hot air, and includes at least one air outlet for exit of the hot air. The heat conducting device is disposed at the air outlet of the air guide hood, and includes a contact wall spaced apart from and disposed below the air outlet for contacting the soldered component, and a surrounding wall extending upwardly from an outer periphery of the contact wall and having one end that is connected to the air guide hood and that surrounds the air outlet. The contact wall and the surrounding wall cooperatively define a flow guiding space for guiding flow of the hot air. The contact wall is disposed to conduct heat to the soldered component to melt the tin solders between the soldered component and the circuit board.

The surrounding wall is a flexible tube which is bendable to be disposed at a desired adjusted angular position so that the contact wall can lie flat against a slanting top wall of the soldered component. The contact wall is connected detachably to the surrounding wall and is made of copper so as to enhance the heat conducting efficiency of the contact wall. The flexible tube is a stainless steel flexible tube.

Preferably, the heat conducting device further includes a first heat insulating tube sleeved around an outer surface of the surrounding wall. Thus, the heat conducting device can be touched by an operator to enhance safety in use while effectively locking the heat within the surrounding wall to enhance the heating efficiency of the contact wall. More preferably, the heat conducting device further includes a second heat insulating tube disposed to be surrounded by an inner surface of the surrounding wall so as to more effectively prevent heat dispersion and enhance the heating efficiency of the contact wall. The first and second heat insulating tubes are respectively fiberglass tubes.

According to another aspect, the heat conducting apparatus of the present invention is suitable for hot-melting tin solders between a circuit board and a soldered component. The heat conducting apparatus includes an air guide hood and a flexible device.

The air guide hood is connected to a hot air supply source for delivering hot air, and includes at least one air outlet for exit of the hot air. The flexible device is disposed at the air outlet of the air guide hood, and includes a flexible tube that is bendable to be disposed at a desired adjusted angular position. The flexible tube has one end connected to the air guide hood and aligned with the air outlet so as to guide the hot air flowing out of the air outlet to the tin solders between the soldered component and the circuit board to melt the tin solders.

The flexible tube is made of a stainless steel material. The flexible device further includes a third heat insulating tube sleeved around an outer surface of the flexible tube. Thus, the flexible device can be touched by an operator to enhance safety in use. More preferably, the flexible device further includes a fourth heat insulating tube disposed to be surrounded by an inner surface of the flexible tube so that the heat of the hot air will not be absorbed by the flexible tube when the hot air flows through the flexible tube. The third and fourth heat insulating tubes are respectively fiberglass tubes.

According to one aspect, the solder melting method for the heat conducting apparatus of the present invention is suitable for hot-melting tin solders between a circuit board and a soldered component, and includes:

(A) heating a heat conducting device in contact with the soldered component to enable the heat conducting device to conduct the heat to the soldered component so as to melt the tin solders between the soldered component and the circuit board; and (B) removing the soldered component so as to separate the soldered component from the circuit board.

In step (A), the heat conducting device is heated by delivering hot air to a flow guiding space in the heat conducting device. In step (B), the soldered component is separated from the circuit board using a magnet of the heat conducting device that attracts the soldered component thereto.

According to another aspect, the solder melting method for the heat conducting apparatus of the present invention is suitable for hot-melting tin solders between a circuit board and a soldered component, and includes:

(A) bending a flexible tube so as to dispose the flexible tube at a position corresponding to the tin solders between the circuit board and the soldered component;

(B) delivering hot air and causing the hot air to be guided by the flexible tube to flow to the tin solders so as to melt the tin solders; and (C) removing the soldered component so as to separate the soldered component from the circuit board.

In step (B), the hot air is guided to flow to the tin solders via an elongated air outlet of an air delivering device assembled to one end of the flexible tube.

The advantages and effects of the heat conducting apparatus of the present invention reside in that, with the arrangement of the heat conducting devices of the heat conducting apparatus to heat the soldered component by heat conduction, or with the configuration of the flexible devices of the heat conducting apparatus that can be bent and disposed at adjusted angular positions, the hot air can be guided to the tin solders between the soldered component and the circuit board to heat and melt the tin solders, thereby reducing any adverse effect on other electronic components or good soldered components on the circuit board.

BRIEF DESCRIPTION OF THE DRAWINGS

Other features and advantages of the present invention will become apparent in the following detailed description of the preferred embodiments with reference to the accompanying drawings, of which:

FIG. 8 is a flowchart of a solder melting method for the first preferred embodiment of the heat conducting apparatus according to the present invention;

FIG. 20 is another exploded perspective view of the third preferred embodiment of the heat conducting apparatus according to the present invention and the circuit board, illustrating a plurality of the heat conducting devices mounted to an air hole device;

FIG. 24 is a flowchart illustrating a solder melting process for the fourth preferred embodiment of the heat conducting apparatus according to the present invention;

FIG. 27 is another schematic view of the fourth preferred embodiment of the heat conducting apparatus according to the present invention in operation and the circuit board, illustrating that the flexible devices are bent and disposed at positions corresponding to tin solders between the circuit board and another soldered component so as to guide the hot air to the tin solders to heat the same;

FIG. 28 is an exploded perspective view of the fifth preferred embodiment of the heat conducting apparatus according to the present invention;

FIG. 29 is a fragmentary schematic partly sectional view of the fifth preferred embodiment of the heat conducting apparatus according to the present invention and a circuit board;

FIG. 30 is a schematic view of the fifth preferred embodiment of the heat conducting apparatus according to the present invention in operation and the circuit board, illustrating that the flexible devices are bent and positioned such that elongated air outlets of air delivering devices correspond to positions of tin solders between the circuit board and the soldered component so as to guide hot air to the tin solders to heat the same;

DETAILED DESCRIPTION OF THE PREFERRED EMBODIMENTS

Figure 1:
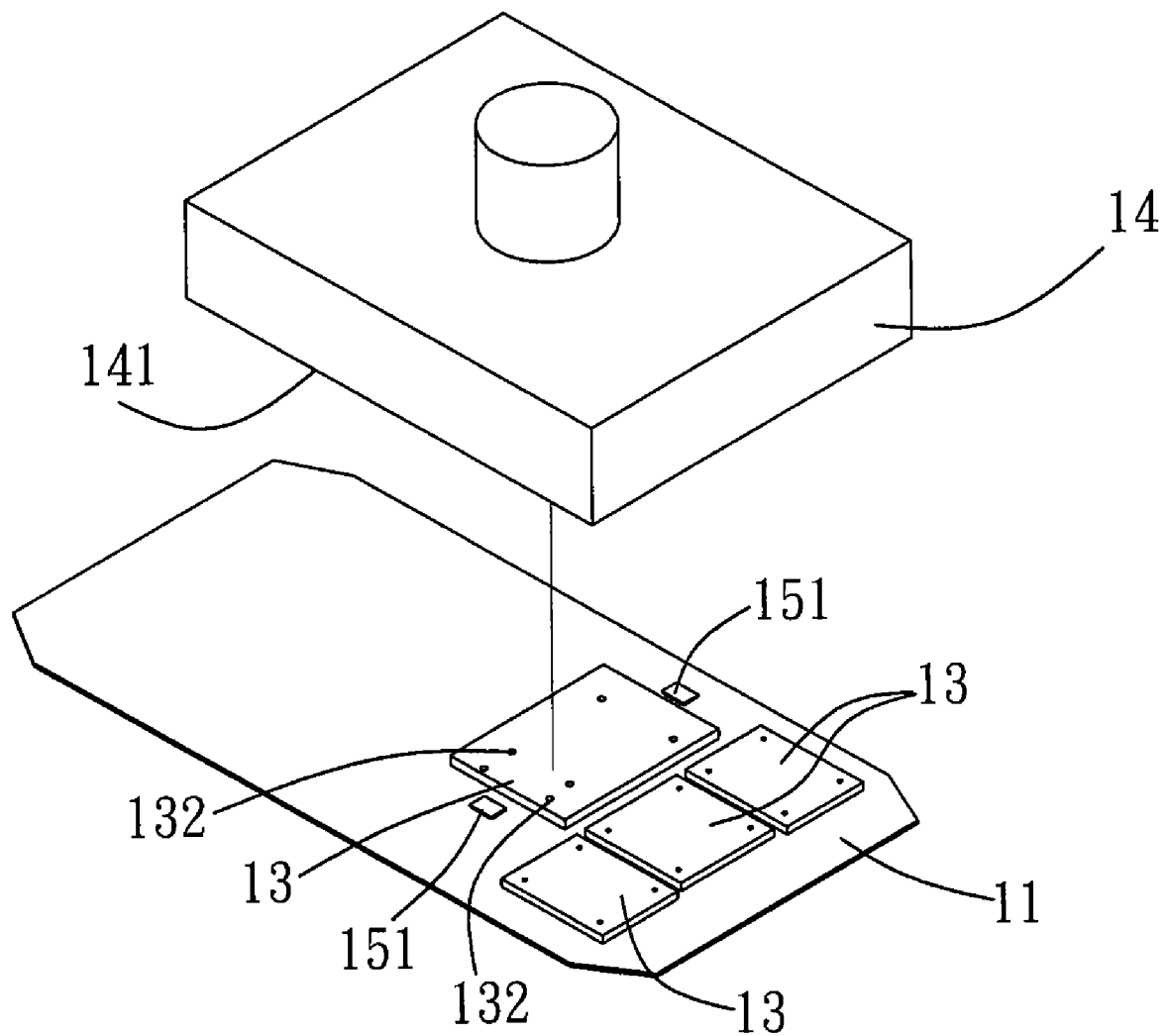
FIG. 1 is an exploded perspective view of a conventional air guide device and a circuit board.
Figure 2:
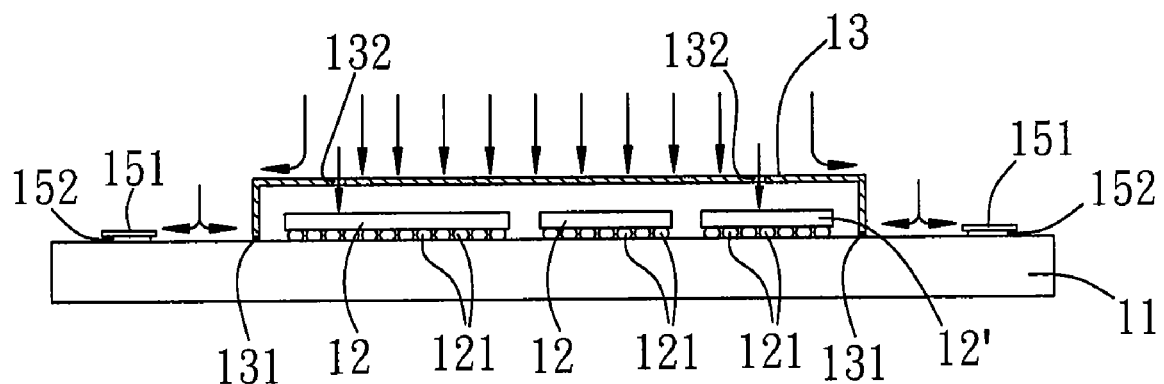
FIG. 2 is a schematic view illustrating how a metal shell is heated by the conventional air guide device via heat convection so as to melt tin pastes between the metal shell and the circuit board.
Figure 3:
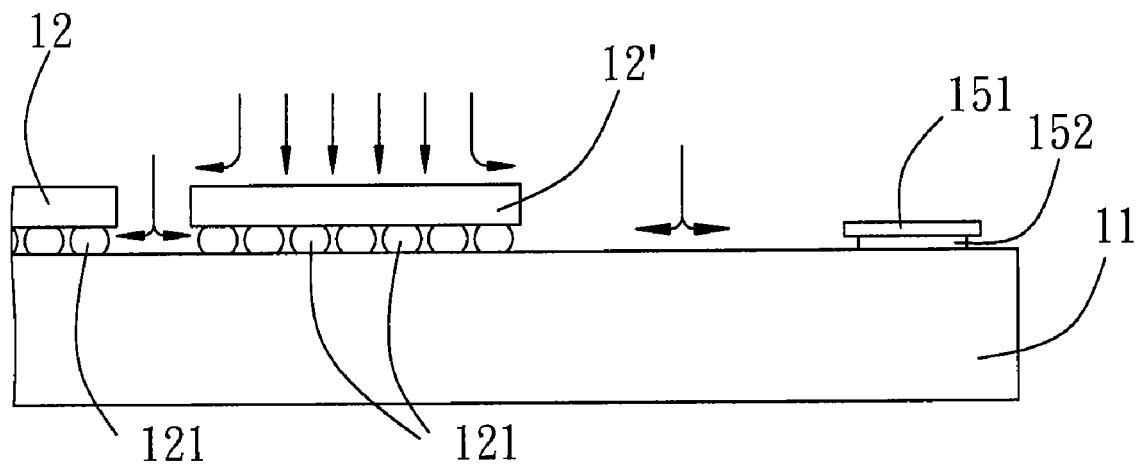
FIG. 3 is a schematic view illustrating how a chip is heated by the conventional air guide device via heat convection so as to melt solder balls between the chip and the circuit board.

Before the present invention is described in greater detail, it should be noted that like elements are denoted by the same reference numerals throughout the disclosure.

Through a description of the preferred embodiments, the technical means employed by the present invention to achieve the intended objects, and the advantageous effects contemplated thereby, can be better understood and appreciated. It is noted that the accompanying drawings are for illustration and reference only, and are not intended to limit the scope of the present invention.

Figure 4:
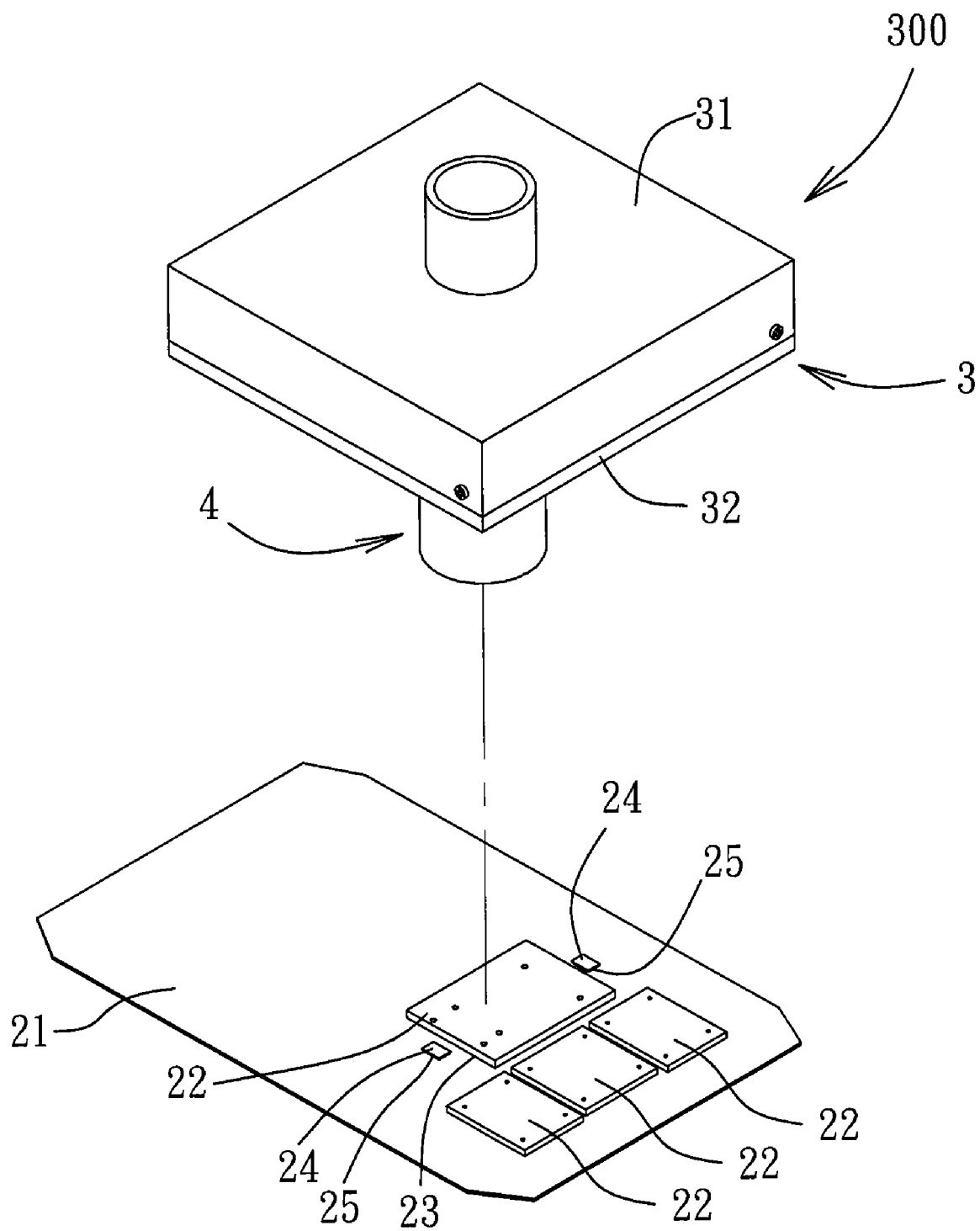
FIG. 4 is an exploded perspective view of the first preferred embodiment of a heat conducting apparatus according to the present invention and a circuit board.

Referring to FIG. 4, the first preferred embodiment of a heat conducting apparatus 300 according to this invention is mounted on a hot air supply source (not shown) of a rework machine, and is essentially suitable for hot-melting tin solders 23 between a circuit board 21 and a soldered component 22, so that the soldered component 22 can be removed from the circuit board 21. In this embodiment, the soldered component 22 is a metal shell for covering a chip so as to shield electromagnetic waves, and the tin solders 23 are tin pastes for welding the metal shell to the circuit board 21.

Figure 5:
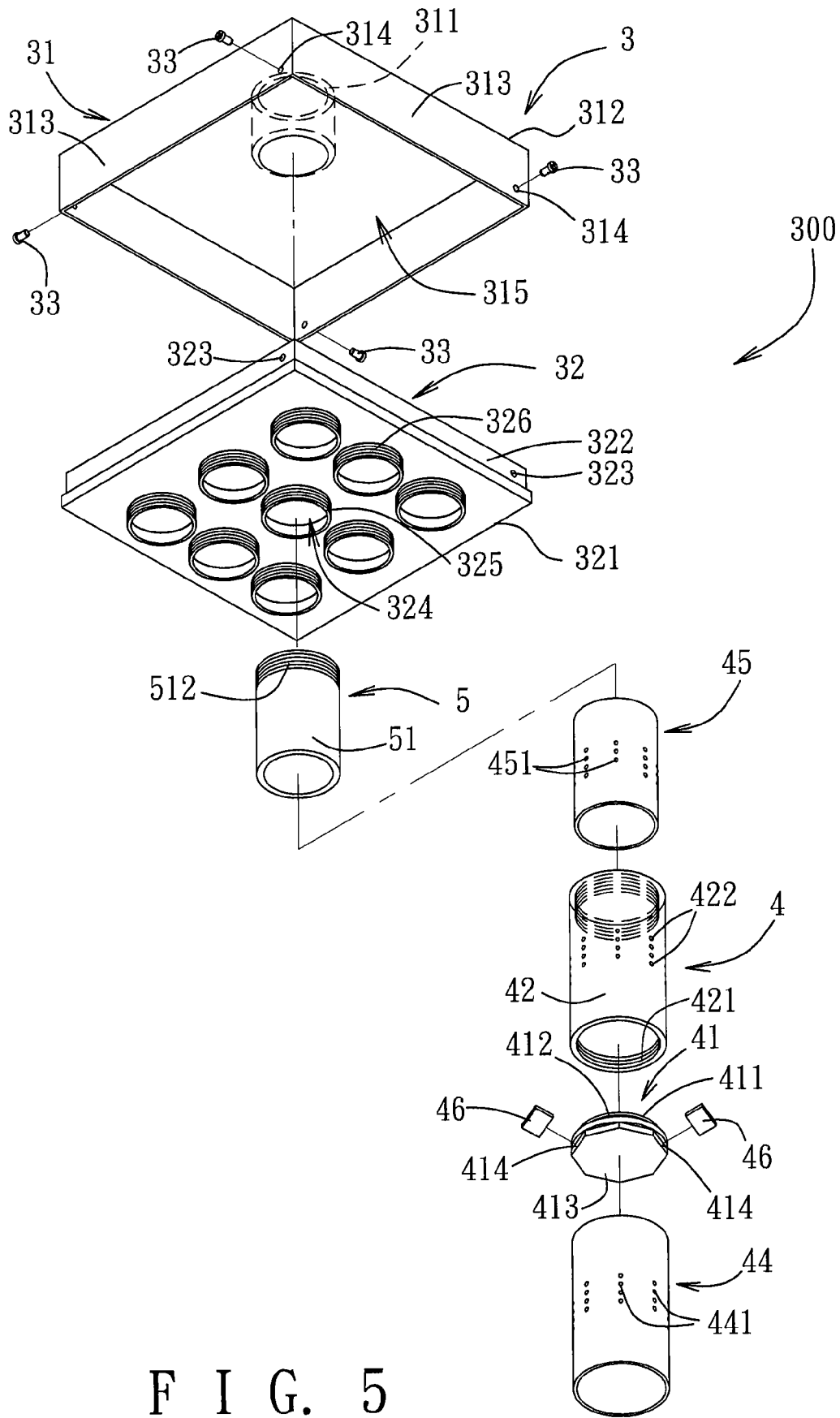
FIG. 5 is an exploded perspective view of the first preferred embodiment of the heat conducting apparatus according to the present invention.
Figure 6:
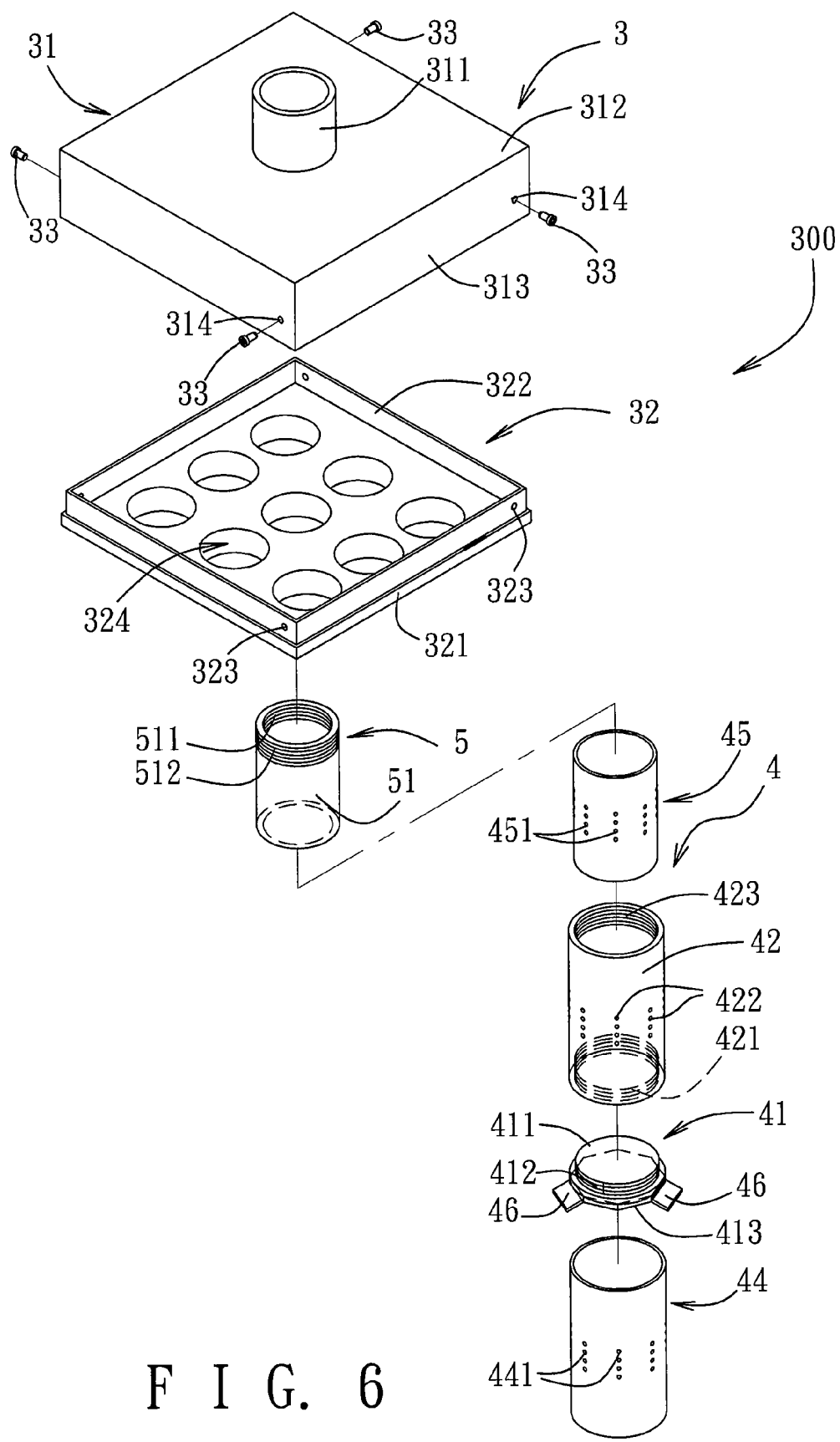
FIG. 6 is an exploded perspective view of the first preferred embodiment of the heat conducting apparatus according to the present invention when viewed from another angle.
Figure 7:
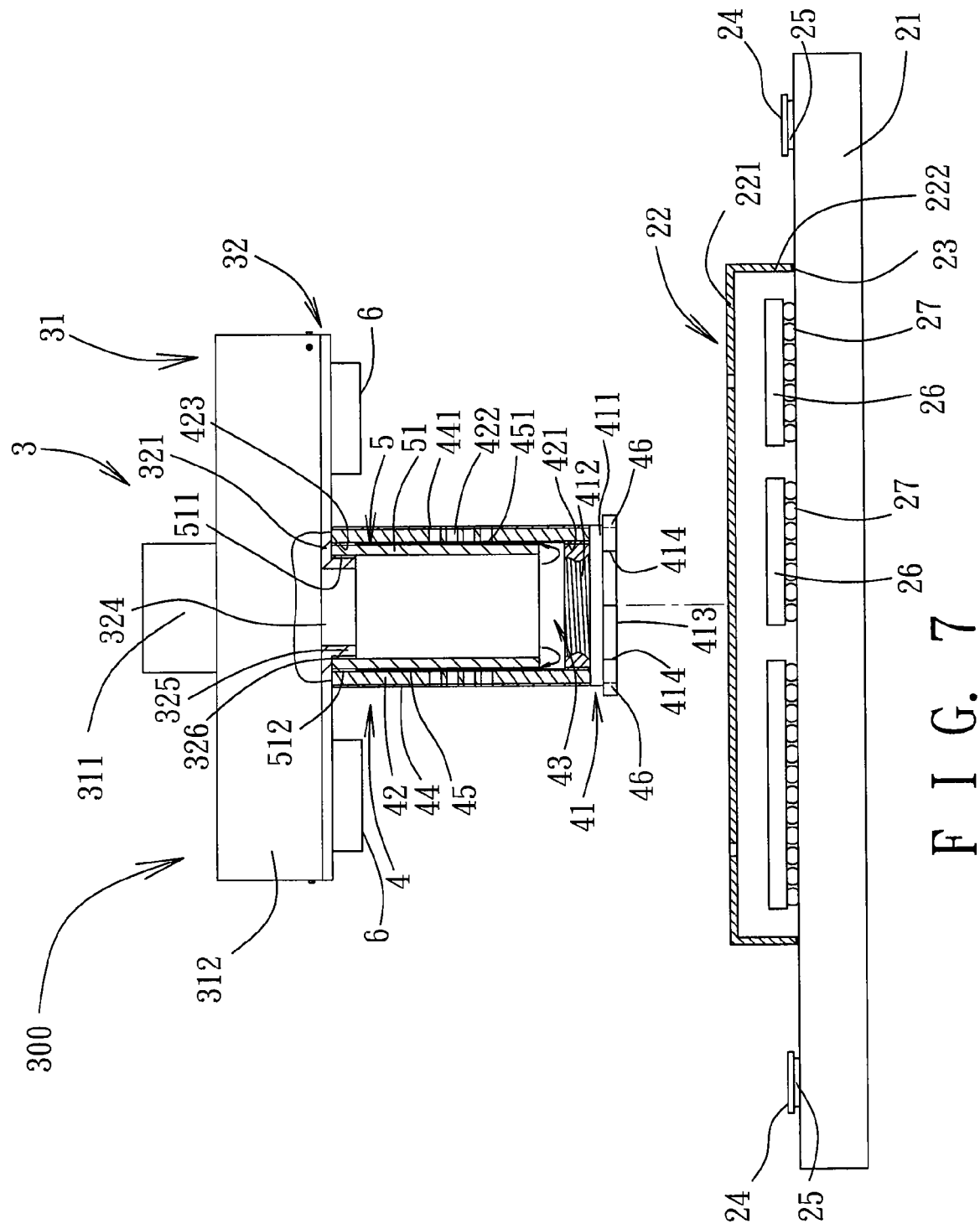
FIG. 7 is a fragmentary schematic partly sectional view of the first preferred embodiment of the heat conducting apparatus according to the present invention and the circuit board, illustrating the assembling relationships among an air hole device, a heat conducting device, and a flexible device.

As shown in FIGS. 5, 6, and 7, the heat conducting apparatus 300 includes an air guide hood 3 connected to the hot air supply source for delivering hot air. The air guide hood 3 includes a hood body 31, and an air hole device 32 mounted detachably to a bottom end of the hood body 31. The hood body 31 includes a hollow cylindrical portion 311 to be connected to the hot air supply source, and a substantially square-shaped hollow casing portion 312 disposed at a bottom end of the hollow cylindrical portion 311. Hot air provided by the hot air supply source can flow into the hollow cylindrical portion 311 from a top end thereof and out of the hollow casing portion 312 through a bottom end of the same. The air hole device 32 includes a substantially square-shaped plate body 321. The plate body 321 has a surrounding coupling wall 322 projecting from a top face thereof. The coupling wall 322 abuts against inner surfaces of sidewalls 313 of the hollow casing portion 312. Screws 33 are inserted into through holes 314 in the sidewalls 313 to engage screw holes 323 in the coupling wall 322, so that the air hole device 32 can be mounted detachably to the hollow casing portion 312 to cover the bottom end of the hollow casing portion 312. The air hole device 32 further includes a plurality of air outlets 324 that extend through upper and lower surfaces of the plate body 321. By means of the hollow casing portion 312 that defines a buffer space 315 in spatial communication with each of the air outlets 324, the hot air flowing into the hollow casing portion 312 via the hollow cylindrical portion 311 can fill the buffer space 315 and flow out through the air outlets 324.

The heat conducting apparatus 300 further includes a heat conducting device 4 that is assembled to the air hole device 32 of the air guide hood 3. The heat conducting device 4 may be selectively disposed at a selected one of the air outlets 324 of the air hole device 32. The heat conducting device 4 is in the form of a cylinder, and includes a contact wall 41 spaced apart from and disposed below the selected one of the air outlets 324 so as to contact the soldered component 22, and a surrounding wall 42 extending upwardly from an outer periphery of the contact wall 41 and having one end to be connected to the air hole device 32. The contact wall includes a substantially disk-shaped threaded portion 411. Through an external thread 412 on an outer peripheral surface of the threaded portion 411 that engages threadedly a lower internal thread 421 which is disposed proximate to a bottom end of an inner surface of the surrounding wall 42, the contact wall 41 may be detachably coupled to the surrounding wall 42. The contact wall 41 and the surrounding wall 42 cooperatively define a flow guiding space 43 in fluid communication with a selected one of the air outlets 324 for guiding the flow of the hot air. Thus, after flowing out of the selected one of the air outlets 324, the hot air can flow downwardly along the flow guiding space 43 to heat the contact wall 41, so that a contact portion 413 of the contact wall 41 that projects from a bottom face of the threaded portion 411 can conduct the heat to a top wall 221 of the soldered component 22 by contact conduction to melt the tin solders 23 between an outer peripheral wall 222 connected to an outer periphery of the top wall 221 and the circuit board 21. In this embodiment, the contact portion 413 has a substantially octagonal outer periphery so as to facilitate locking or removal of the contact wall 41 to or from the surrounding wall 42 by an operator using a wrench, thereby permitting convenient assembly and disassembly. Certainly, the outer periphery of the contact portion 413 may be configured to have a hexagonal shape or any other polygonal shape.

In order for the contact wall 41 to have a better heat conducting effect, the contact wall 41 is made of copper, which has good heat conductivity, so that the hot air in the flow guiding space 43 can quickly heat the contact wall 41 and that heat can be conducted to the soldered component 22 through the contact portion 413 of the contact wall 41. Furthermore, in application, in order that the contact wall 41 may have an inclination angle to enable the contact portion 413 to lie flat against a slanting top wall 221' (see FIG. 11) of the soldered component 22, the surrounding wall 42 of the heat conducting device 4 may be configured to be a flexible tube. By bending the flexible tube and disposing the same at a desired adjusted angular position, the contact portion 413 of the contact wall 41 may lie flat against the slanting top wall 221'. In this embodiment, the flexible tube is a flexible stainless steel tube.

Preferably, in this embodiment, in order to enable the operator to touch the surrounding wall 42 and bend the same to a desired angle during operation of the heat conducting apparatus 300 so as to avoid scalding the operator and at the same time prevent the hot air from dispersing to the ambient environment when flowing through the flow guiding space 43 so as to conserve energy, the heat conducting device 4 further includes a first heat insulating tube 44 sleeved on an outer surface of the surrounding wall 42. The first heat insulating tube 44 is a fiberglass tube capable of withstanding a high temperature of around 600° C., and can be fitted on the outer surface of the surrounding wall 42 by virtue of the inherent elasticity thereof or can be glued thereto using an adhesive. Since the working temperature of the heat conducting apparatus 300 during the operational process is lower than 600° C., the arrangement of the first heat insulating tube 44, which has good heat resistance, can protect the operators from being scalded, thereby enhancing safety in use. Moreover, the heat can be effectively locked within the surrounding wall 42 to increase the heating efficiency of the contact wall 41, so that the hot air supply source can accomplish heating of the contact wall 41 without consuming too much energy, thereby achieving energy conservation.

In addition, in order to more effectively prevent heat dispersion and to further increase the heating efficiency of the contact wall 41, the heat conducting device 4 further includes a second heat insulating tube 45 that is disposed to be surrounded by an inner surface of the surrounding wall 42. The second heat insulating tube 45 similarly is a fiberglass tube capable of withstanding a high temperature of 600° C. The second heat insulating tube 45 can be glued to the inner surface of the surrounding wall 42 by an adhesive so that the heat will not be absorbed by the surrounding wall 42 when the hot air flows along the flow guiding space 43, and will be directly conducted to the contact wall 41, thereby enhancing the heating efficiency of the contact wall 41 considerably. It is noted that, although the first and second heat insulating tubes 44, 45 in this embodiment are exemplified to be fiberglass tubes, the present invention should not be limited thereto. Any material capable of withstanding high temperatures and having poor heat conductivity may be used. In addition, the heat conducting device 4 of this embodiment may include only the first heat insulating tube 44 and dispense with the second heat insulating tube 45, and the effects of preventing heat dispersion and enhancing the heating efficiency of the contact wall 41 can likewise be achieved.

The surrounding wall 42 further includes a plurality of air discharge holes 422 disposed in an intermediate section thereof to communicate the flow guiding space with the ambient environment. The first heat insulating tube 44 includes a plurality of first through holes 441 corresponding in position and number to the air discharge holes 422. The second heat insulating tube 45 includes a plurality of second through holes 451 corresponding in position and number to the air discharge holes 422. The hot air in the flow guiding space 43 will flow upward after blowing downwardly to the contact wall 41. Through the arrangement of the air discharge holes 422 and the first and second through holes 441, 451, the upwardly flowing hot air can be discharged to the ambient environment through the second through holes 451, the air discharge holes 422, and the first through holes 441 sequentially, thereby reducing generation of turbulences between the upwardly flowing hot air and the downwardly flowing hot air.

The air hole device 32 further includes a plurality of peripheral walls 325 projecting from a bottom face of the plate body 321 and located respectively at outer peripheries of the air outlets 324. The heat conducting apparatus 300 further includes a flexible device 5. The flexible device 5 includes a flexible tube 51 made of stainless steel which is connected to a selected one of the peripheral walls 325 of the air hole device 32. Through an internal thread 511 which is disposed on an inner surface of the flexible tube 51 adjacent to a top end thereof and which is engageable threadedly with an external thread 326 on an outer surface of the selected one of the peripheral walls 325, the flexible tube 51 can be connected detachably to the air hole device 32 of the air guide hood 3. In addition, through the flexible tube 51 that is connected to the air hole device 32 and that surrounds the corresponding air outlet 324, and by means of an upper internal thread 423 that is disposed on the inner surface of the surrounding wall 42 adjacent to a top end thereof and that is engageable threadedly with an external thread 512 disposed on an outer surface of the flexible tube 51 adjacent to a top end thereof, the surrounding wall 42 of the heat conducting device 4 can be sleeved detachably on an outer periphery of the flexible tube 51.

Since the length of the surrounding wall 42 may be greater than that of the flexible tube 51, and since the inner diameter of the surrounding wall 42 may be slightly greater than the outer diameter of the flexible tube 51, when the surrounding wall 42 is sleeved on the flexible tube 51, a bottom end of the flexible tube 51 is spaced apart from the threaded portion 411 of the contact wall 41. Thus, when the hot air exiting the corresponding air outlet 324 flows to the contact wall 41 and is blocked thereby, the hot air will flow upwardly and outwardly to a gap between the flexible tube 51 and the surrounding wall 42 and then through the second through holes 451, the air discharge holes 422, and the first through holes 441 to the ambient environment. This can effectively prevent heat dispersion and enhance the heating efficiency of the contact wall 41 while avoiding damage caused to the rework machine by hot air flowing back to the air guide hood 3 via the corresponding air outlet 324.

Figure 9:
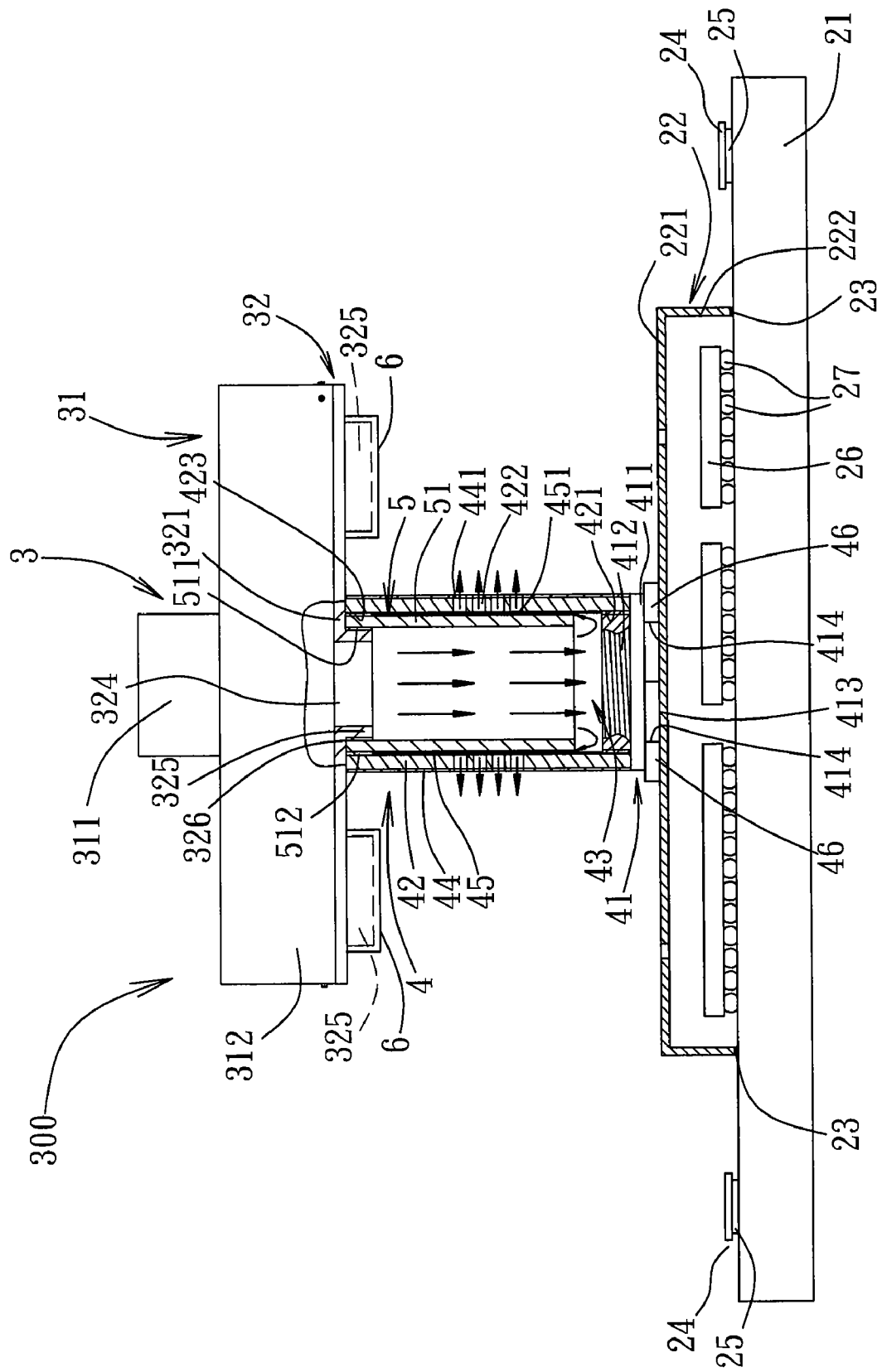
FIG. 9 is a fragmentary schematic partly sectional view of the first preferred embodiment of the heat conducting apparatus according to the present invention and the circuit board, illustrating how hot air heats a contact wall of the heat conducting device, which conducts the heat to a soldered component to melt tin solders between the soldered component and the circuit board.

As shown in FIGS. 7 and 9, in this embodiment, the heat conducting apparatus 300 further includes a plurality of covers 6. Each of the covers 6 can be connected threadedly to the external thread 326 (see FIG. 5) of a respective one of the peripheral walls 325 of the air hole device 32 so as to cover the corresponding air outlet 324. Therefore, in case only one heat conducting device 4 is assembled to the air hole device 32 of the heat conducting apparatus 300, the operator can selectively connect the covers 6 to the peripheral walls 325 so as to cover the air outlets 324 not provided with the heat conducting devices 4, thereby reducing loss of heat and consumption of energy.

A solder melting method for the heat conducting apparatus 300 will be described in detail hereinbelow. FIG. 8 is a flowchart illustrating the solder melting method for the heat conducting apparatus 300.

In step 81, the heat conducting device 4 in contact with the soldered component 22 is heated so that the heat conducting device 4 conducts the heat to the soldered component 22 to melt the tin solders 23 between the soldered component 22 and the circuit board 21.

In operation, the heat conducting apparatus 300 is moved from the position shown in FIG. 7 to the position shown in FIG. 9 such that the contact portion 413 of the contact wall 41 of the heat conducting device 4 abuts against the top wall 221 of the soldered component 22. Subsequently, the hot air flowing out of the selected air outlet 324 is guided by the flexible tube 51 to flow to a bottom end of the flow guiding space 43 in a direction indicated by the arrows so as to directly heat the contact wall 41 of the heat conducting device 4. By virtue of the force of the downward blowing hot air, the contact portion 413 of the contact wall 41 can tightly abut against the top wall 221 of the soldered component 22, thereby increasing the heat conduction rate. Since the hot air is blocked by the contact wall 41, the hot air will flow upward and outward to the gap between the flexible tube 51 and the surrounding wall 42 in directions indicated by the arrows, and then through the second through holes 451, the air discharge holes 422, and the first through holes 441 to the ambient environment. Preferably, the heat conducting device 4 further includes two magnets 46 that are attached to two opposite peripheral faces 414 of the contact portion 413 by magnetic attraction. Through the magnets 46 that are attractable to the top wall 221 of the soldered component 22, the contact portion 413 of the contact wall 41 can abut against the top wall 221 more tightly. Certainly, there may be provided only one magnet 46 or more than two magnets 46.

When heat is conducted from the contact wall 41 to the soldered component 22 to heat the soldered component 22, the tin solders 23 between the outer peripheral wall 222 of the soldered component 22 and the circuit board 21 can be melted. Since the heat conductivity coefficient of the circuit board 21 is far lower than that of the metallic soldered component 22, during the process of conducting heat from the contact wall 41 to the soldered component 22, the circuit board 21 is not heated as much as the soldered component 22. Thus, the effect on tin pastes 25 of electronic components 24 or tin solders 27 of soldered components 26 can be reduced. Herein, the soldered components 26 are BGA chips, and the tin solders 27 are solder balls.

Figure 10:
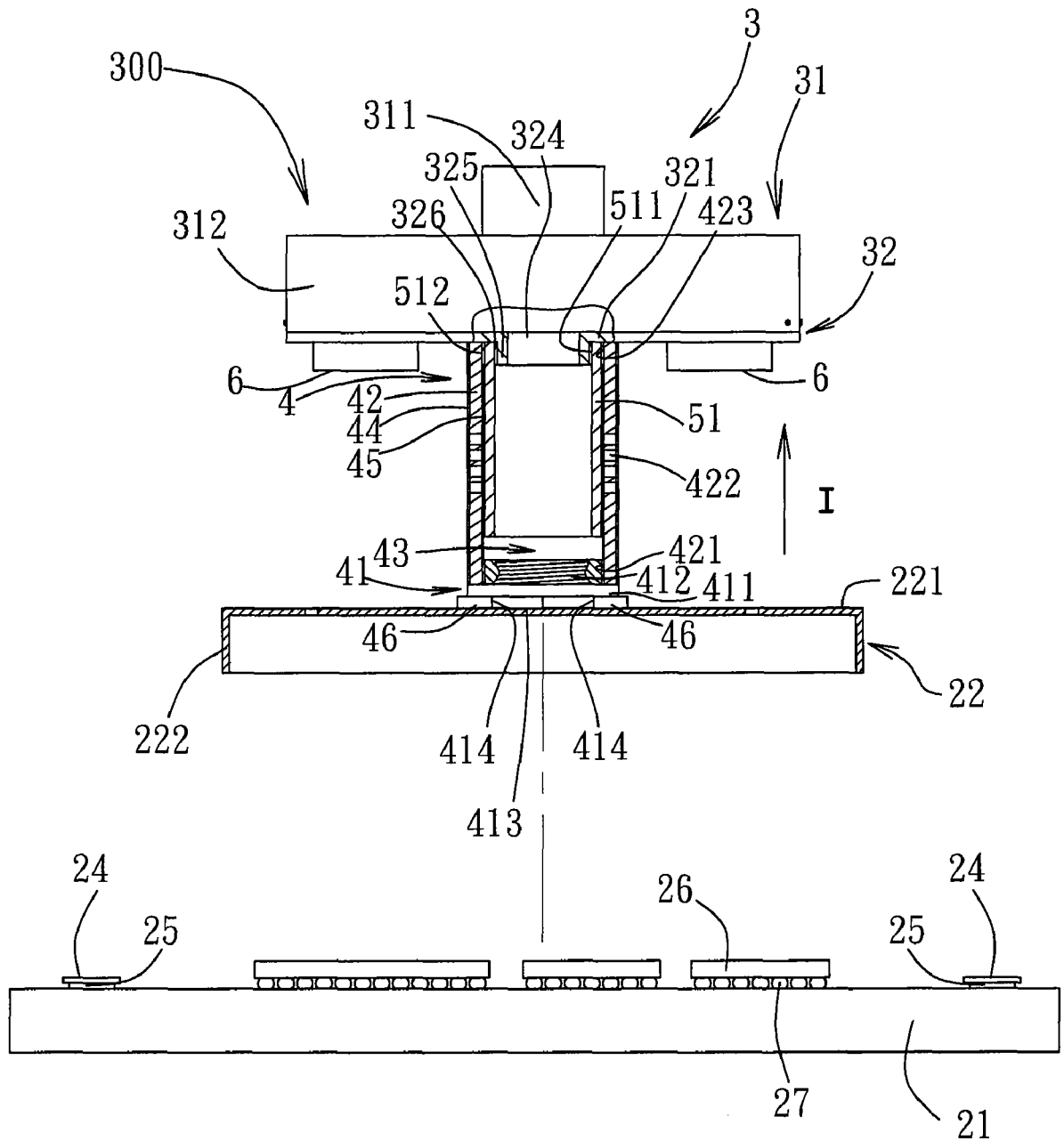
FIG. 10 is another fragmentary schematic partly sectional view of the first preferred embodiment of the heat conducting apparatus according to the present invention and the circuit board, illustrating how the heat conducting apparatus can be used to separate the soldered component from the circuit board by means of magnets that can attract the soldered component thereto after the tin solders are melted.

Referring to FIGS. 8 and 10, in step 82, the soldered component 22 is removed so as to be separated from the circuit board 21. After the tin solders 23 (see FIG. 9) between the outer peripheral wall 222 of the soldered component 22 and the circuit board 21 are completely melted, the heat conducting apparatus 300 can be moved upwardly in a direction indicated by the arrow (I). Since the magnets 46 on the outer peripheral faces 414 of the contact portion 413 can attract the top wall 221 of the soldered component 22 thereto, upward movement of the heat conducting apparatus 300 can bring the soldered component 22 to move upwardly therewith so as to separate the soldered component 22 from the circuit board 21, thereby facilitating removal of the soldered component 22.

Figure 11:
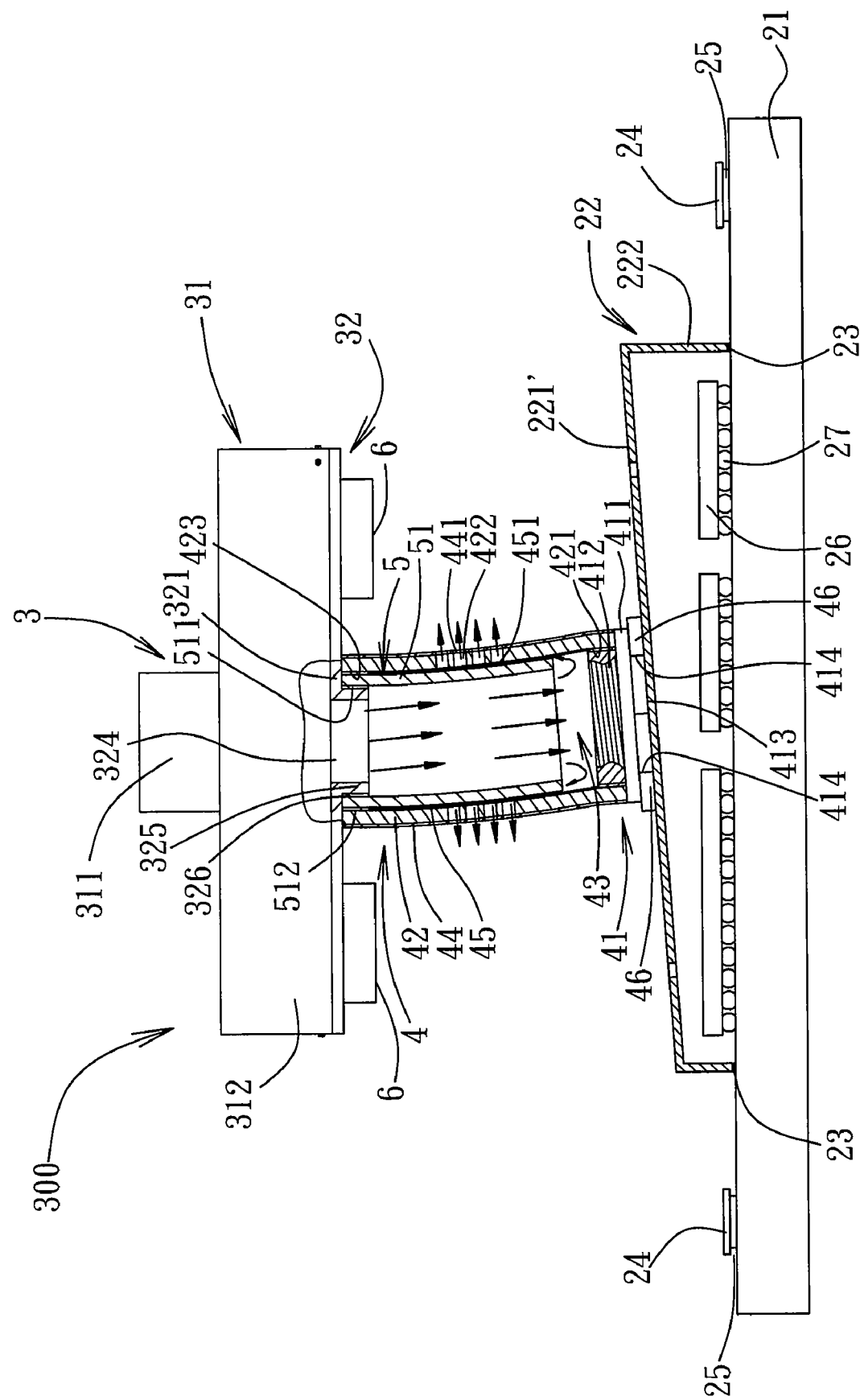
FIG. 11 is still another fragmentary schematic partly sectional view of the first preferred embodiment of the heat conducting apparatus according to the present invention and the circuit board, illustrating how a surrounding wall of the heat conducting device and a flexible tube of the flexible device are bendable to enable a contact portion of the contact wall to lie flat against a slanting top wall of the soldered component.

Referring to FIG. 11, since the flexible tube 51 and the surrounding wall 42 are both stainless steel tubes, when the second heat insulating tube 45 at the inner surface of the surrounding wall 42 comes into contact with the flexible tube 51 during adjustment of the angle of the surrounding wall 42 by the operator, the flexible tube 51 will be brought to bend with the second heat insulating tube 45. Therefore, by heating the contact wall 41 directly with the hot air flowing out of the bottom end of the flexible tube 51, the efficiency of heating the contact wall 41 with the hot air will not be affected, so that the contact wall 41 may still conduct the heat quickly to the slanting top wall 221' of the soldered component 22.

Figure 12:
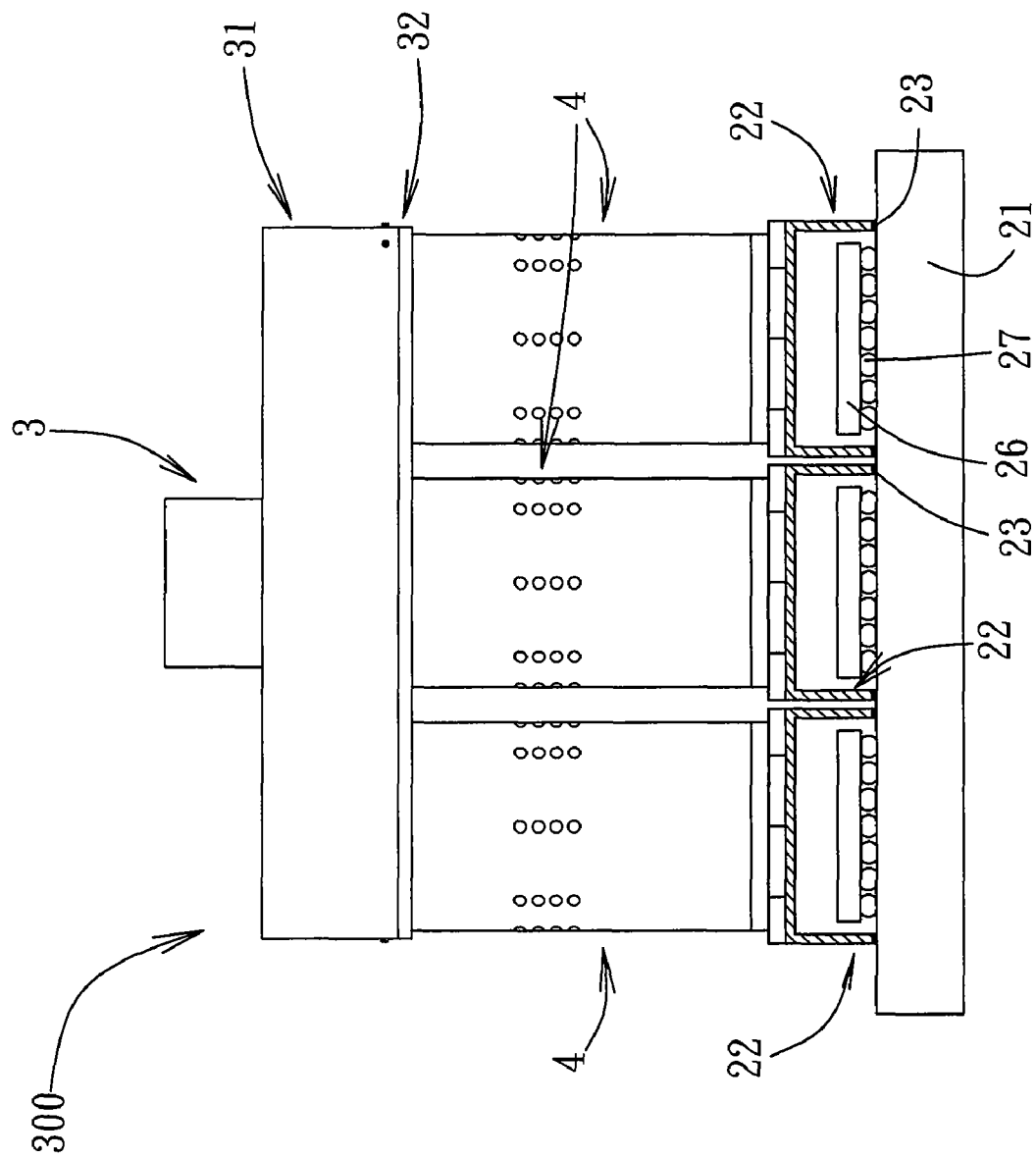
FIG. 12 is yet another fragmentary schematic partly sectional view of the first preferred embodiment of the heat conducting apparatus according to the present invention and the circuit board, illustrating a plurality of the heat conducting devices assembled to the air hole device to heat a plurality of the soldered components simultaneously.

In application, the air hole device 32 of the heat conducting apparatus 300 may have a plurality of the heat conducting devices 4 assembled thereto, as shown in FIG. 12, so as to heat a plurality of the soldered components 22 on the circuit board 21 simultaneously. Thus, the tin solders 23 between each of the plurality of soldered components 22 and the circuit board 21 can be melted simultaneously.

Figure 13:
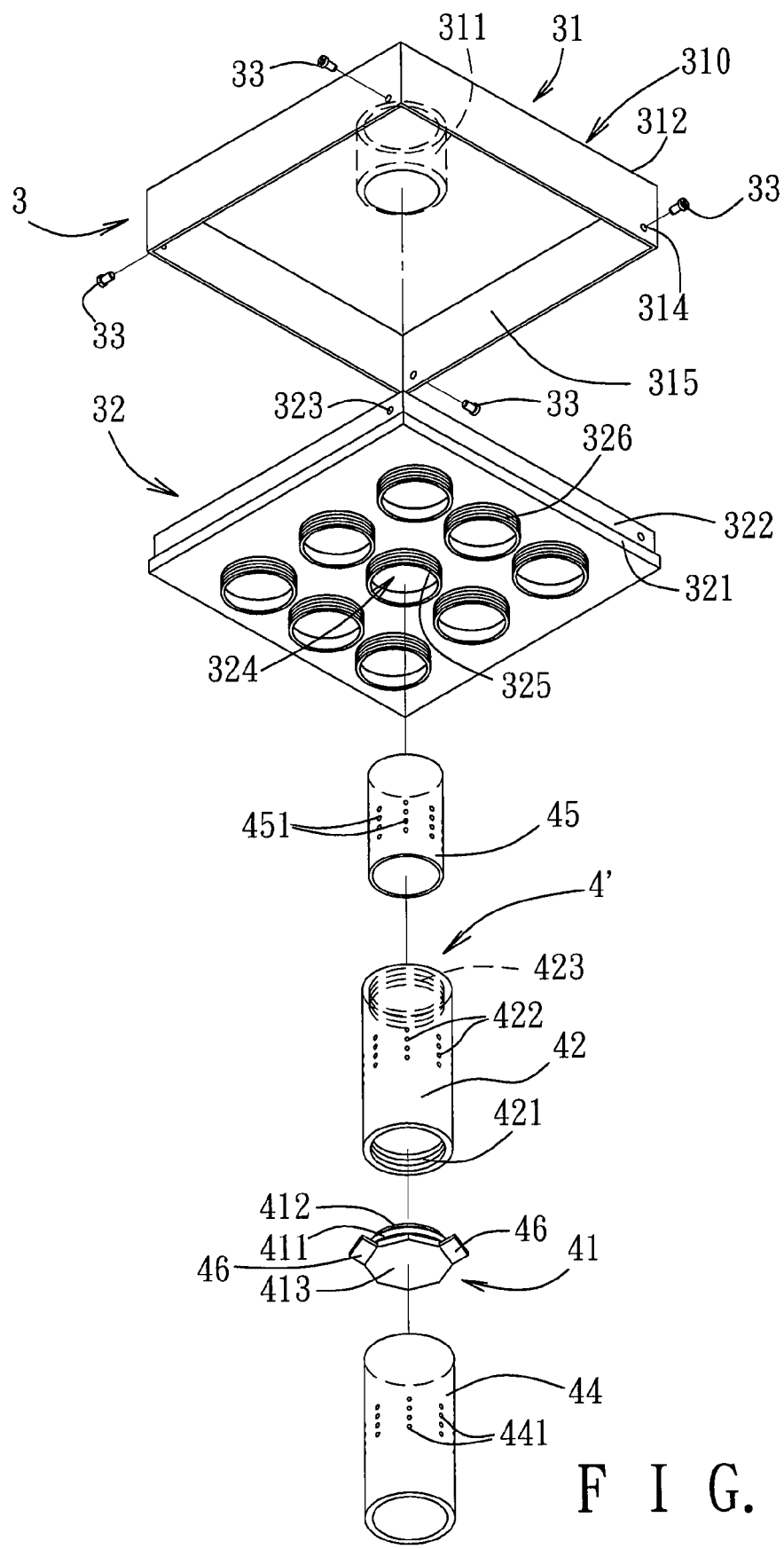
FIG. 13 is an exploded perspective view of the second preferred embodiment of the heat conducting apparatus according to the present invention.
Figure 14:
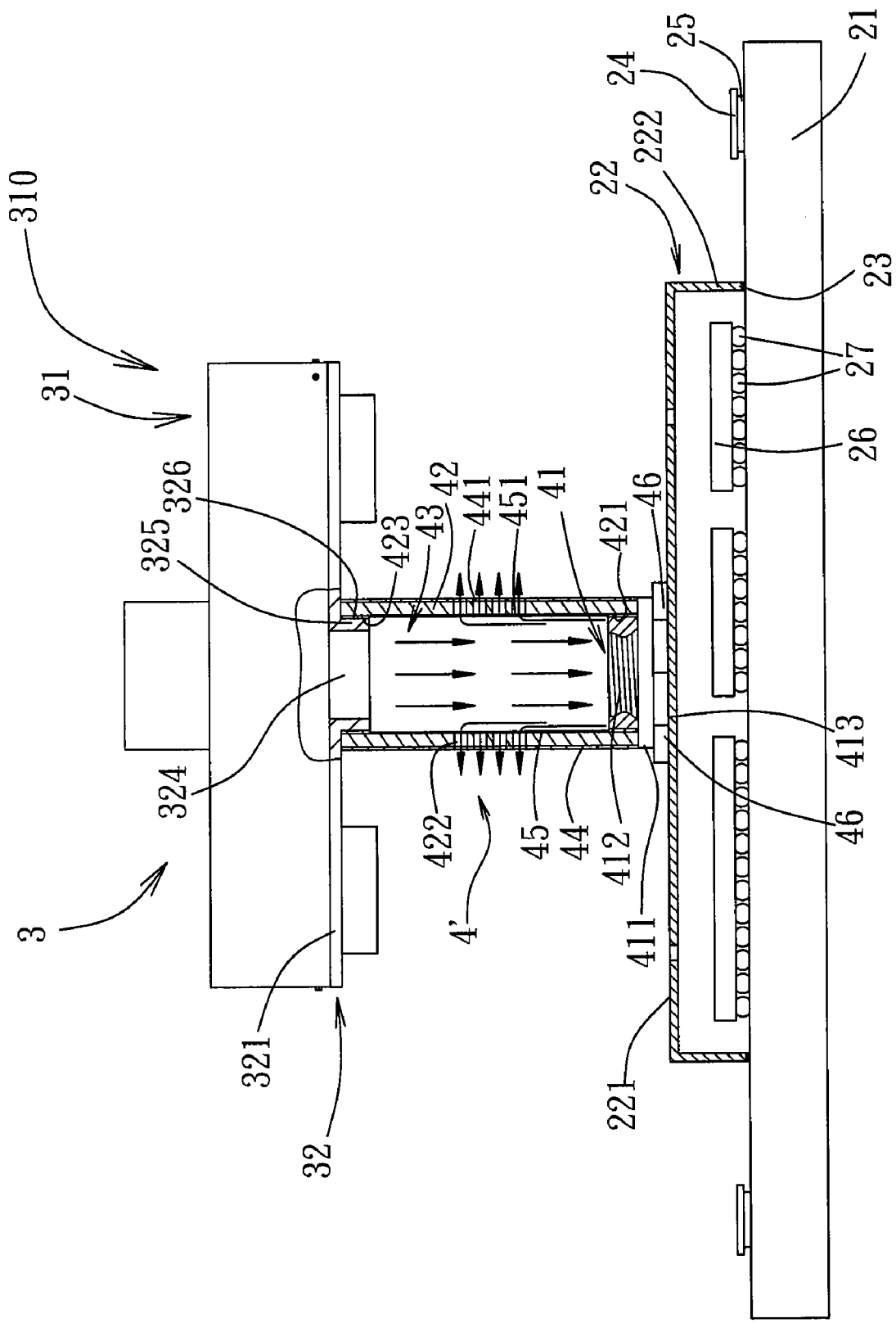
FIG. 14 is a fragmentary schematic partly sectional view of the second preferred embodiment of the heat conducting apparatus according to the present invention and a circuit board, illustrating how hot air heats a contact wall of a heat conducting device, which conducts the heat to a soldered component to melt tin solders between the soldered component and the circuit board.

Referring to FIGS. 13 and 14, the second preferred embodiment of a heat conducting apparatus 310 according to the present invention is substantially the same as the first preferred embodiment in terms of the solder melting method employed therefor. The differences reside in that the heat conducting apparatus 310 does not include the flexible device 5, and that the outer diameter of the surrounding wall 42 of the heat conducting device 4' is smaller than that of the surrounding wall 42 of the heat conducting device 4 in the first preferred embodiment. Furthermore, the surrounding wall 42 of the heat conducting device 4' is connected to the peripheral wall 325 of the air hole device 32 by virtue of threaded engagement between the upper internal thread 423 and the external thread 326.

The hot air flowing out of the air outlet 324 of the air guide hood 3 can be guided by the flow guiding space 43 so as to flow directly to the bottom end thereof in a direction indicated by the arrows for heating the contact wall 41 of the heat conducting device 4'. Due to the contact wall 41 that blocks the hot air, the hot air will flow upwardly and outwardly in directions indicated by the arrows and then through the second through holes 451, the air discharge holes 422, and the first through holes 441 to the ambient environment. When heat is conducted to the soldered component 22 through the contact wall 41 to heat the soldered component 22, the tin solders 23 between the outer peripheral wall 222 of the soldered component 22 and the circuit board 21 can be melted. After the tin solders 23 are completely melted, due to the magnets 46 that can attract the top wall 221 of the soldered component 22 thereto, upward movement of the heat conducting apparatus 310 can bring the soldered component 22 to move upwardly therewith so as to be separated from the circuit board 21.

Figure 15:
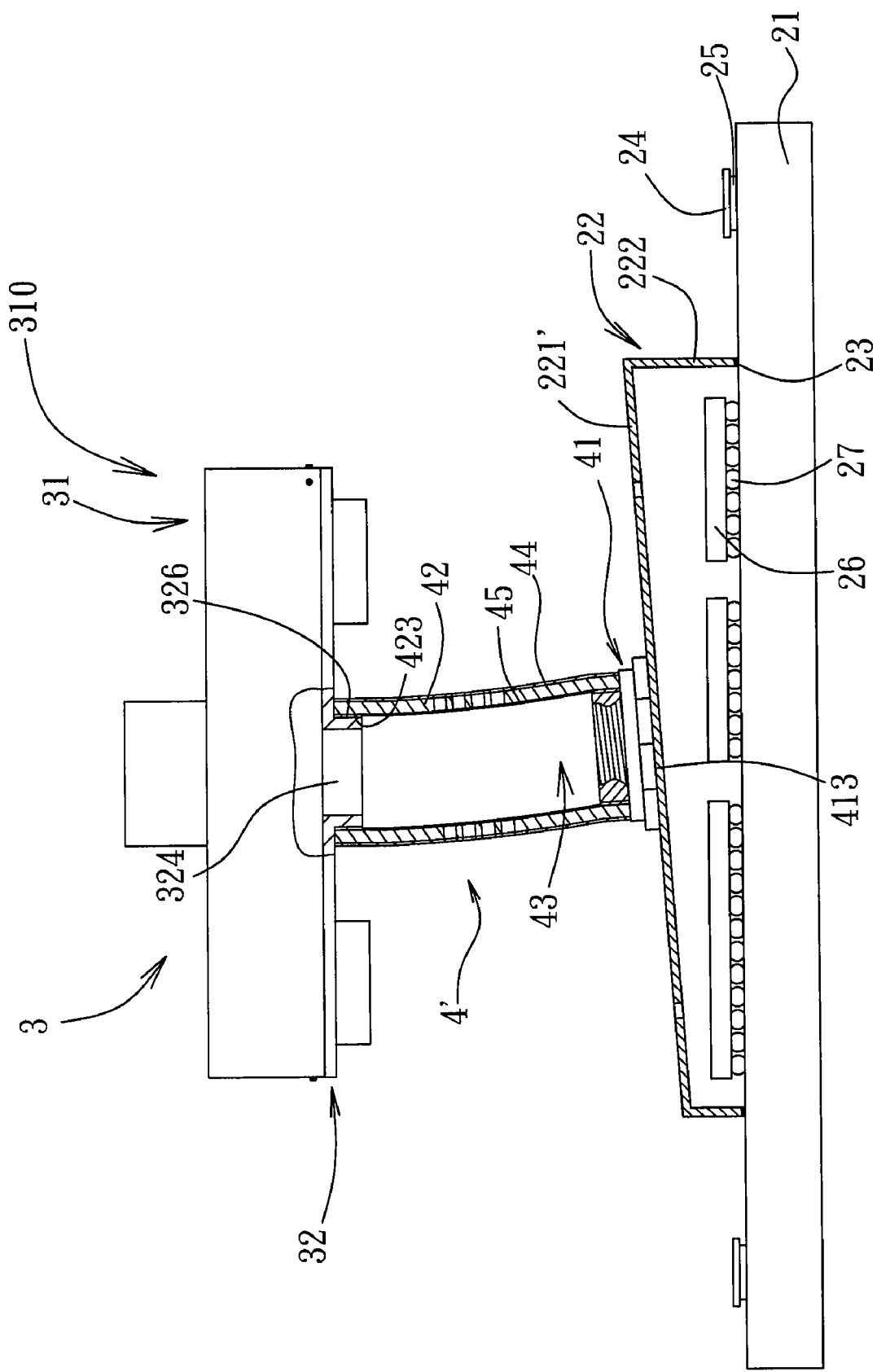
FIG. 15 is another fragmentary schematic partly sectional view of the second preferred embodiment of the heat conducting apparatus according to the present invention and the circuit board, illustrating how a surrounding wall of the heat conducting device is bendable to enable a contact portion of the contact wall to lie flat against a slanting top wall of the soldered component.
Figure 16:
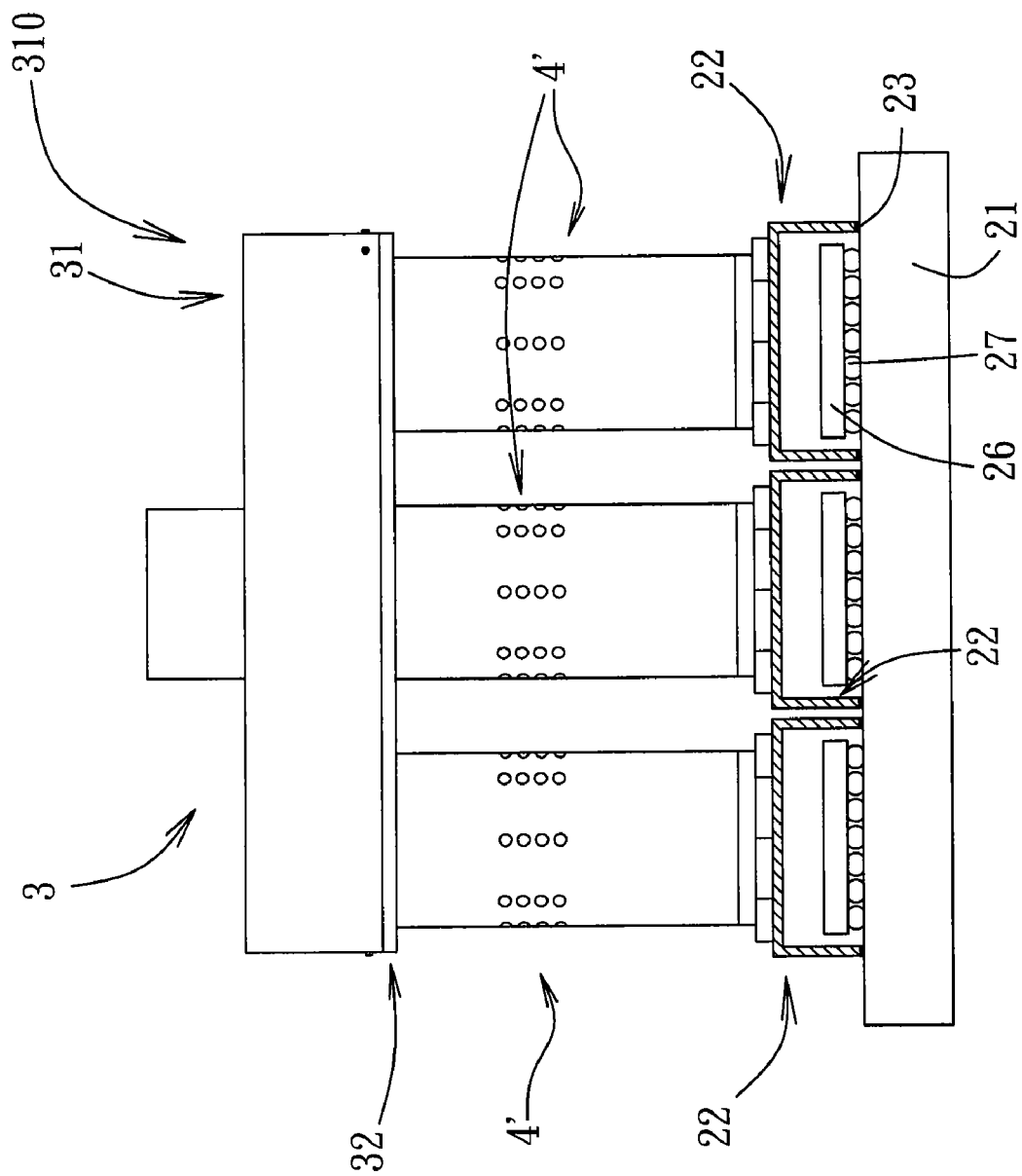
FIG. 16 is still another fragmentary schematic partly sectional view of the second preferred embodiment of the heat conducting apparatus according to the present invention and the circuit board, illustrating a plurality of the heat conducting devices assembled to an air hole device to heat a plurality of the soldered components simultaneously.

In application, the operator can bend the surrounding wall 42 to position the same at a desired adjusted angular position such that the contact portion 413 of the contact wall 41 can lie flat against the slanting top wall 221', as shown in FIG. 15. Furthermore, the air hole device 32 of the heat conducting apparatus 310 may have a plurality of the heat conducting devices 4' assembled thereto, as shown in FIG. 16, so as to heat a plurality of the soldered components 22 on the circuit board 21 simultaneously. Thus, the tin solders 23 between each of the plurality of soldered components 22 and the circuit board 21 can be melted simultaneously.

Figure 17:
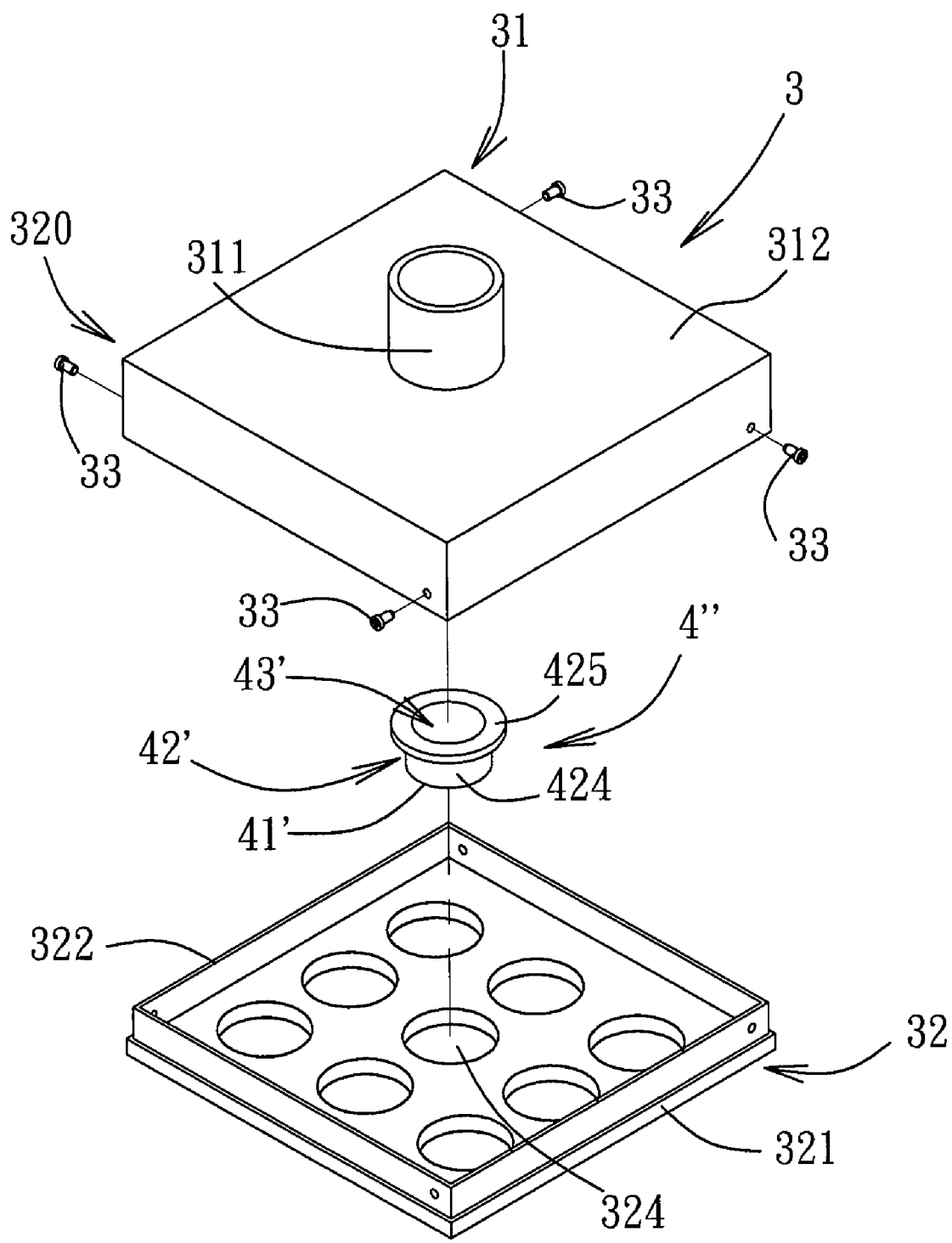
FIG. 17 is an exploded perspective view of the third preferred embodiment of the heat conducting apparatus according to the present invention.
Figure 18:
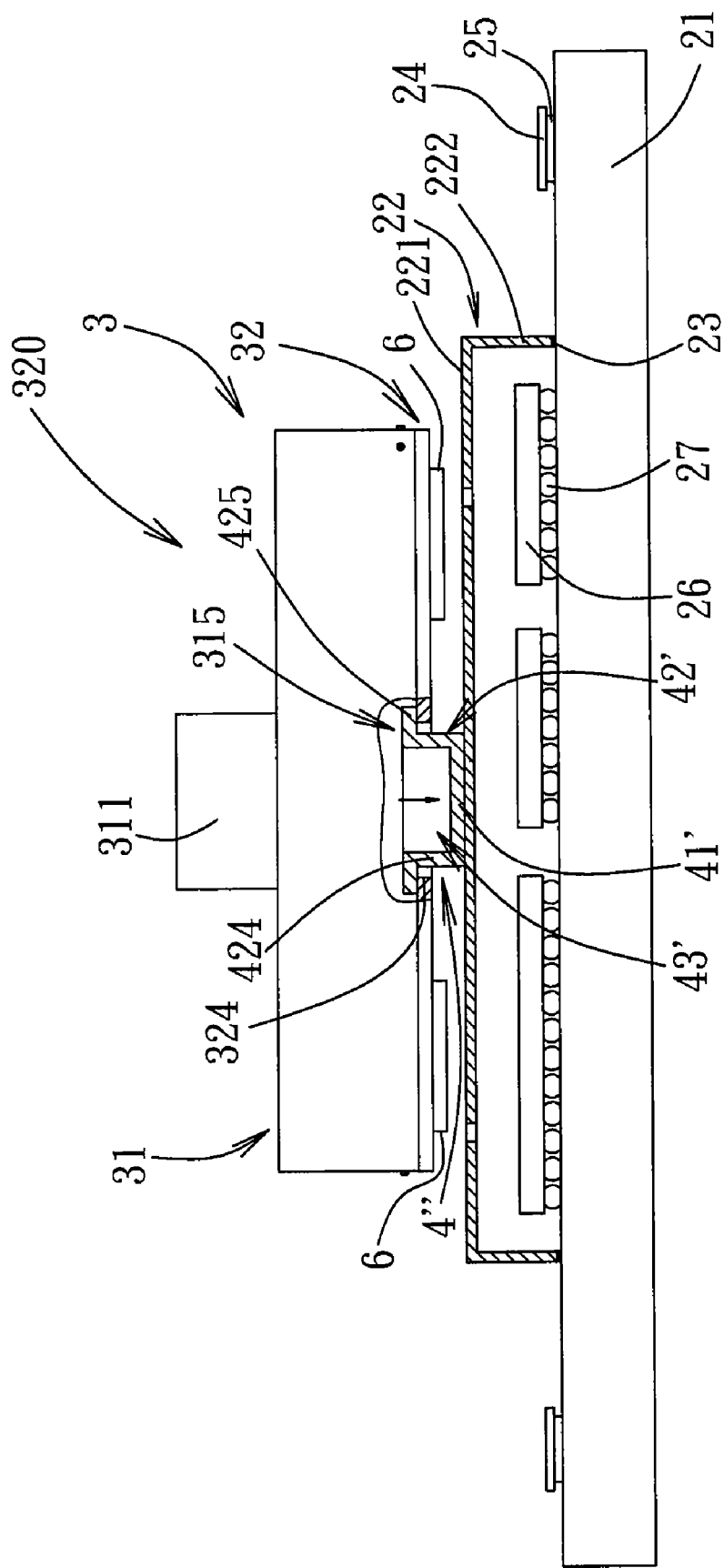
FIG. 18 is a fragmentary schematic partly sectional view of the third preferred embodiment of the heat conducting apparatus according to the present invention and the circuit board, illustrating how hot air heats a contact wall of a heat conducting device, which conducts the heat to a soldered component to melt tin solders between the soldered component and the circuit board.

Referring to FIGS. 17 and 18, the third preferred embodiment of a heat conducting apparatus 320 according to the present invention is substantially the same as the first preferred embodiment in terms of the solder melting method employed therefor. The differences reside in that the heat conducting apparatus 320 does not include the flexible device 5, and the construction of the heat conducting device 4" in this embodiment is different from that of the heat conducting device 4 in the first preferred embodiment.

The heat conducting device 4" is made of copper, and includes a contact wall 41' for contacting the soldered component 22, and a surrounding wall 42' extending upwardly from the outer periphery of the contact wall 41' and connected to the air hole device 32. The contact wall 41' and the surrounding wall 42' cooperatively define a flow guiding space 43' for guiding flow of the hot air. The surrounding wall 42' includes a wall body 424 connected to the contact wall 41', and an engaging ring 425 projecting radially outward from an outer surface of the wall body 424 and disposed adjacent to a top end of the same. Since the outer diameter of the wall body 424 is smaller than the diameter of each of the air outlets 324, and since the outer diameter of the engaging ring 425 is greater than the diameter of each of the air outlets 324, the wall body 424 of the surrounding wall 42' of the heat conducting device 4" can extend through the selected air outlet 324 from the top face of the plate body 321 of the air hole device 32. Through the engaging ring 425 that engages the top face of the plate body 321 of the air hole device 32, the heat conducting device 4" can be assembled onto the air hole device 32, and the contact wall 41' of the heat conducting device 4" can project from a bottom end of the air hole device 32.

Figure 19:
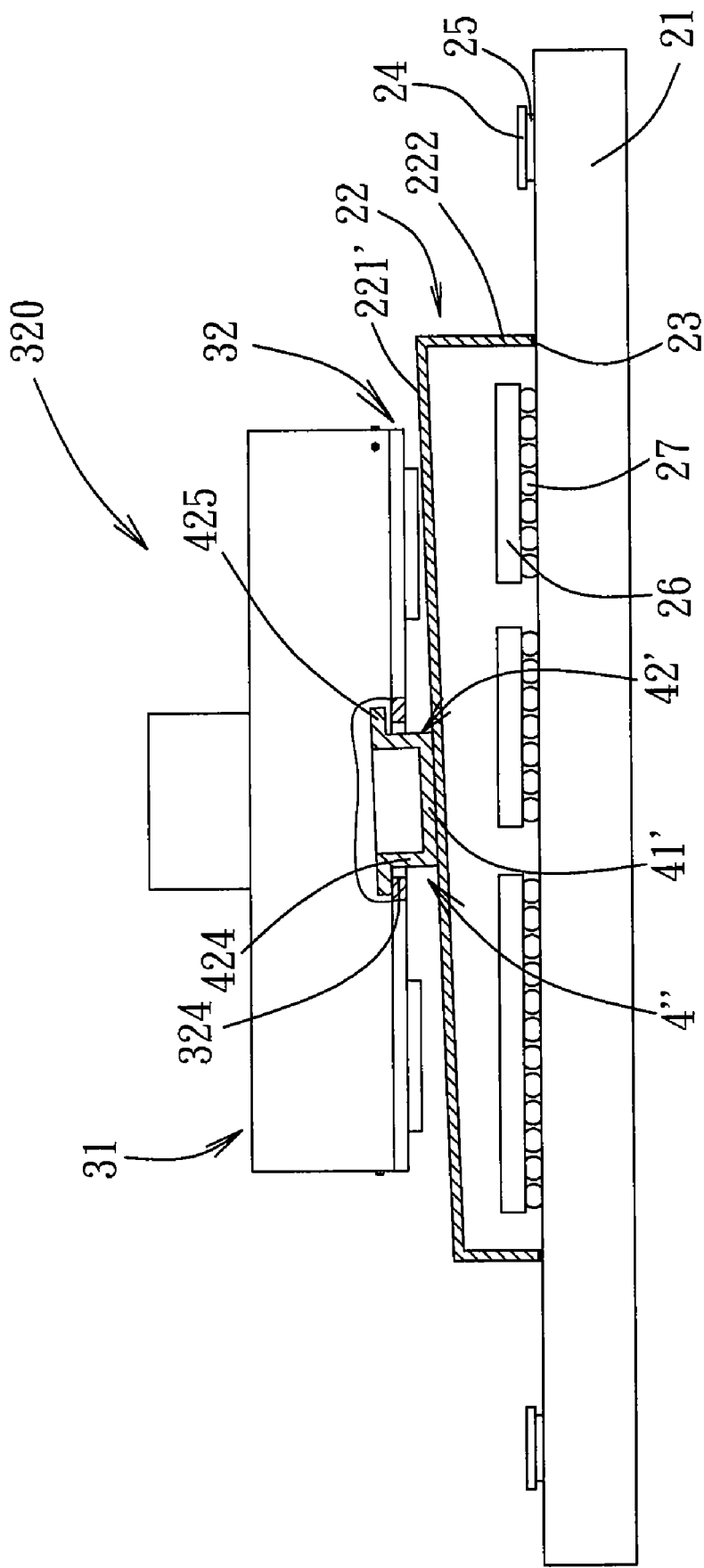
FIG. 19 is another fragmentary schematic partly sectional view of the third preferred embodiment of the heat conducting apparatus according to the present invention and the circuit board, illustrating how the heat conducting device is movable upwardly and downwardly and tilted so that the contact portion of the contact wall can lie flat against a slanting top wall of the soldered component.

The hot air in the buffer space 315 of the air guide hood 3 can flow directly into the flow guiding space 43' of the heat conducting device 4" to the bottom end of the flow guiding space 43' in a direction indicated by the arrow (see FIG. 18) to heat the contact wall 41'. When heat is conducted to the soldered component 22 through the contact wall 41' to heat the soldered component 22, the tin solders 23 between the outer peripheral wall 222 of the soldered component 22 and the circuit board 21 can be melted. After the tin solders 23 are completely melted, the soldered component 22 can be removed from the circuit board 21. As shown in FIG. 19, since the outer diameter of the wall body 424 of the surrounding wall 42' is smaller than the diameter of each of the air outlets 324, and since the outer diameter of the engaging ring 425 is greater than the diameter of each of the air outlets 324, the heat conducting device 4" is movable upwardly and downwardly relative to the air hole device 32 and can be tilted at an angle. Thus, the contact wall 41' of the heat conducting device 4" can lie flat against the slanting top wall 221', as shown in FIG. 19.

Figure 21:
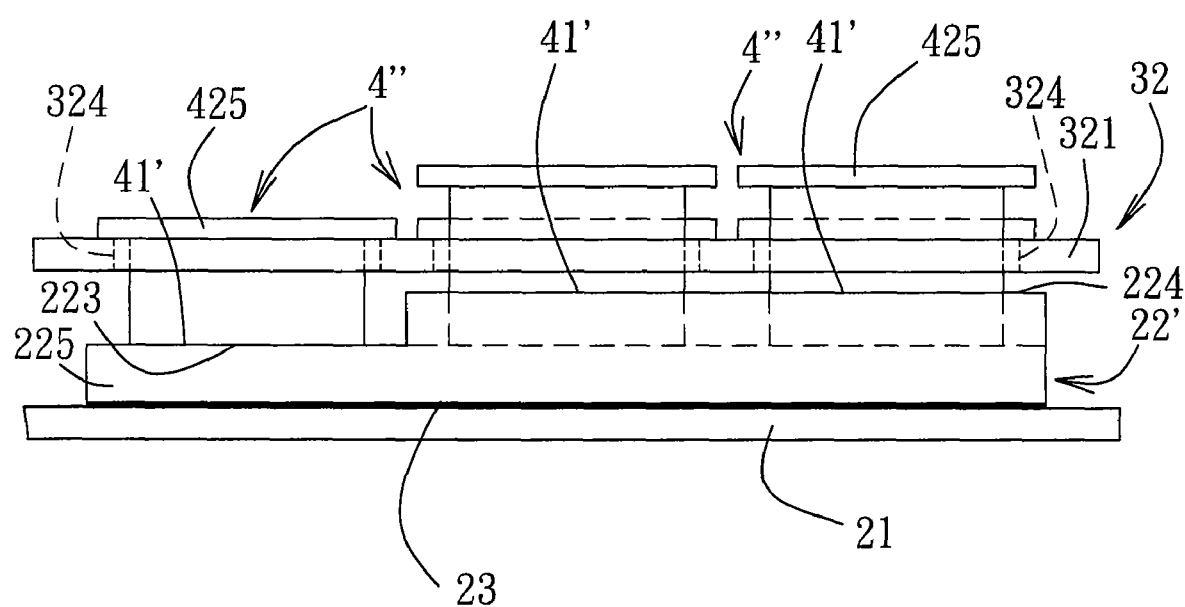
FIG. 21 is a schematic side view of the third preferred embodiment of the heat conducting apparatus according to the present invention and the circuit board, illustrating that a plurality of the heat conducting devices are assembled to the air hole device to heat a soldered component having higher and lower top wall portions.

Referring to FIGS. 20 and 21, when it is desired to assemble a plurality of the heat conducting devices 4" that correspond in number to the air outlets 324 to the air hole device 32, the air hole device 32 may be configured to dispense with the peripheral wall 325. The heat conducting devices 4" of the heat conducting apparatus 320 may be used to heat a soldered component 22' having an uneven top wall. When the contact walls 41' of some of the heat conducting devices 4" abut against a lower first top wall portion 223 of the soldered component 22', the engaging rings 425 of the corresponding heat conducting devices 4" will engage the top face of the plate body 321 of the air hole device 32. On the other hand, when the contact walls 41' of some of the heat conducting devices 4" abut against a higher second top wall portion 224 of the soldered component 22', the corresponding heat conducting devices 4" will be blocked by the second top wall portion 224 and forced to move upward so that the engaging rings 425 thereof are spaced apart from the plate body 321. Thus, the heat conducting devices 4" of the heat conducting apparatus 320 can conduct the heat evenly to the first and second top wall portions 223, 224 of the soldered component 22' to melt all the tin solders 23 between the peripheral wall 225 and the circuit board 21, thereby preventing occurrence of such instances where some of the tin solders 23 cannot be sufficiently heated for melting the same due to a difference in height.

Figure 22:
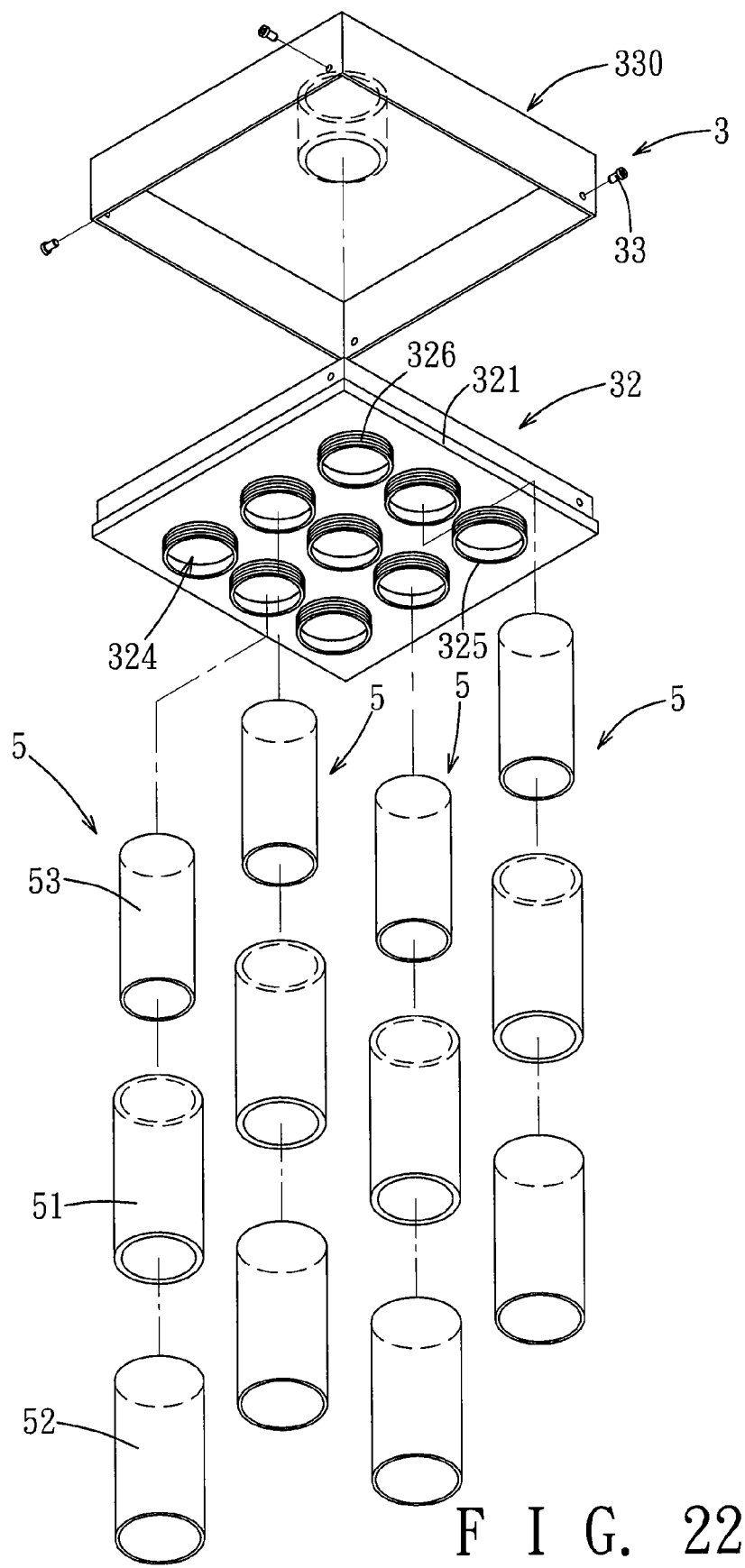
FIG. 22 is an exploded perspective view of the fourth preferred embodiment of the heat conducting apparatus according to the present invention.
Figure 23:
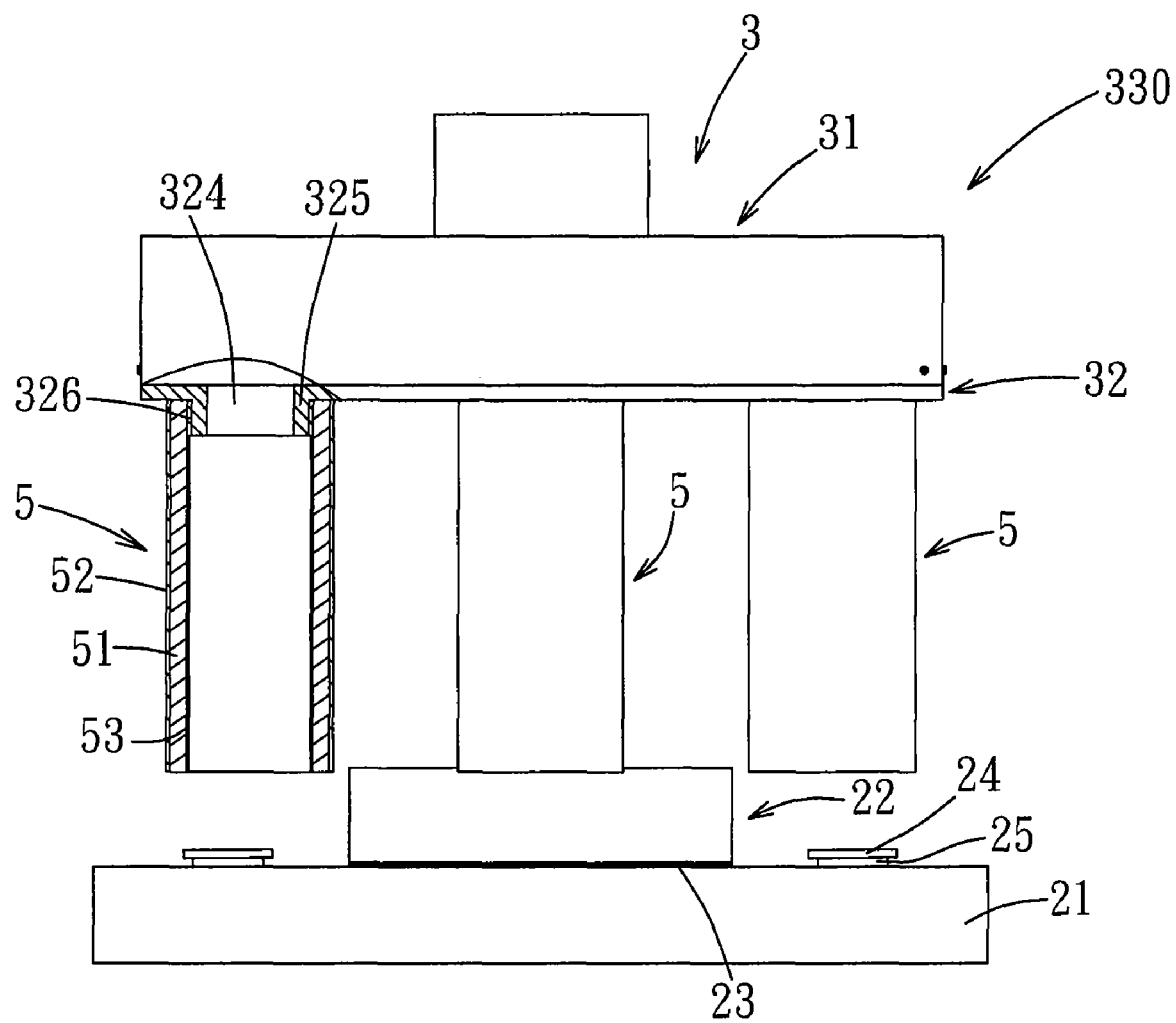
FIG. 23 is a fragmentary schematic partly sectional view of the fourth preferred embodiment of the heat conducting apparatus according to the present invention and a circuit board.

Referring to FIGS. 22 and 23, the fourth preferred embodiment of a heat conducting apparatus 330 according to the present invention is different from the first preferred embodiment in overall structure and the solder melting method therefor.

The heat conducting apparatus 330 includes a plurality of flexible devices 5 disposed on the air hole device 32. In this embodiment, the heat conducting apparatus 330 is exemplified to have four flexible devices 5. Each of the flexible devices 5 includes a flexible tube 51, which has one end connected threadedly to the peripheral wall 325 of the air hole device 32 and aligned with a corresponding air outlet 324. The flexible tube 51 is bendable by the operator so as to guide the hot air flowing out through the corresponding air outlet 324 to the tin solders 23 between the soldered component 22 and the circuit board 21 to melt the tin solders 23. Preferably, each of the flexible devices 5 further includes a third heat insulating tube 52 that is sleeved around an outer surface of the flexible tube 51. The third heat insulating tube 52 is a fiberglass tube capable of withstanding a high temperature of 600° C., and can be fitted on the outer surface of the flexible 51 by virtue of the inherent elasticity thereof or can be glued thereto using an adhesive. Thus, apart from protecting the operator from being scalded to enhance safety in use, the heat can be effectively locked within the flexible tube 51 to prevent dispersion of the hot air to the ambient environment through the flexible tube 51 as the hot air flows within the flexible tube 51. Furthermore, each of the flexible devices 5 further includes a fourth heat insulating tube 53 disposed to be surrounded by an inner surface of the flexible tube 51. The fourth heat insulating tube 53 is likewise a fiberglass tube which can be glued to the inner surface of the flexible tube 51 using an adhesive. Thus, the heat energy will not be absorbed by the flexible tube 51 when the hot air flows through the flexible tube 51.

Figure 25:
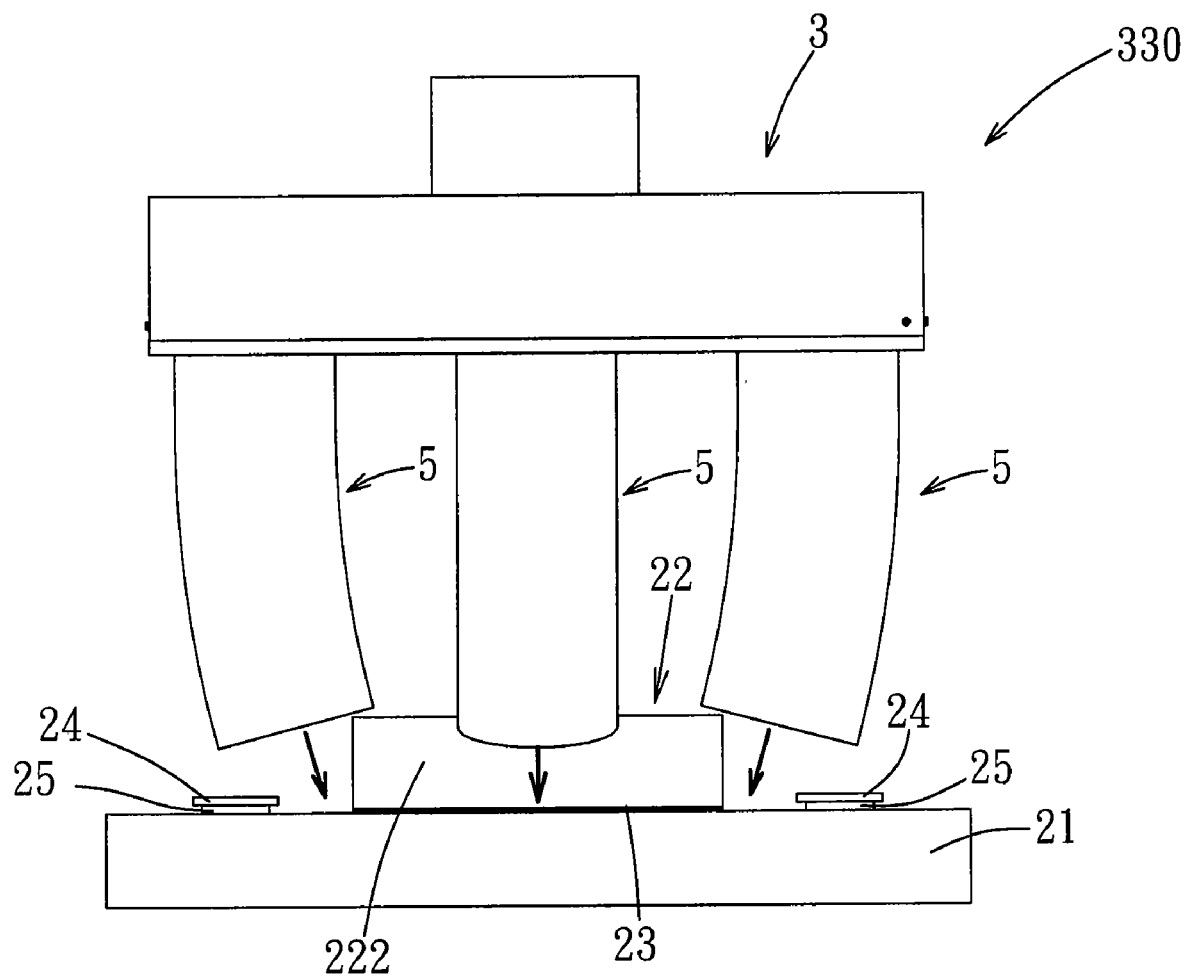
FIG. 25 is a schematic view of the fourth preferred embodiment of the heat conducting apparatus according to the present invention in operation and the circuit board, illustrating that flexible devices are bent and disposed at positions corresponding to tin solders between the circuit board and a soldered component so as to guide hot air to the tin solders to heat the same.
Figure 26:
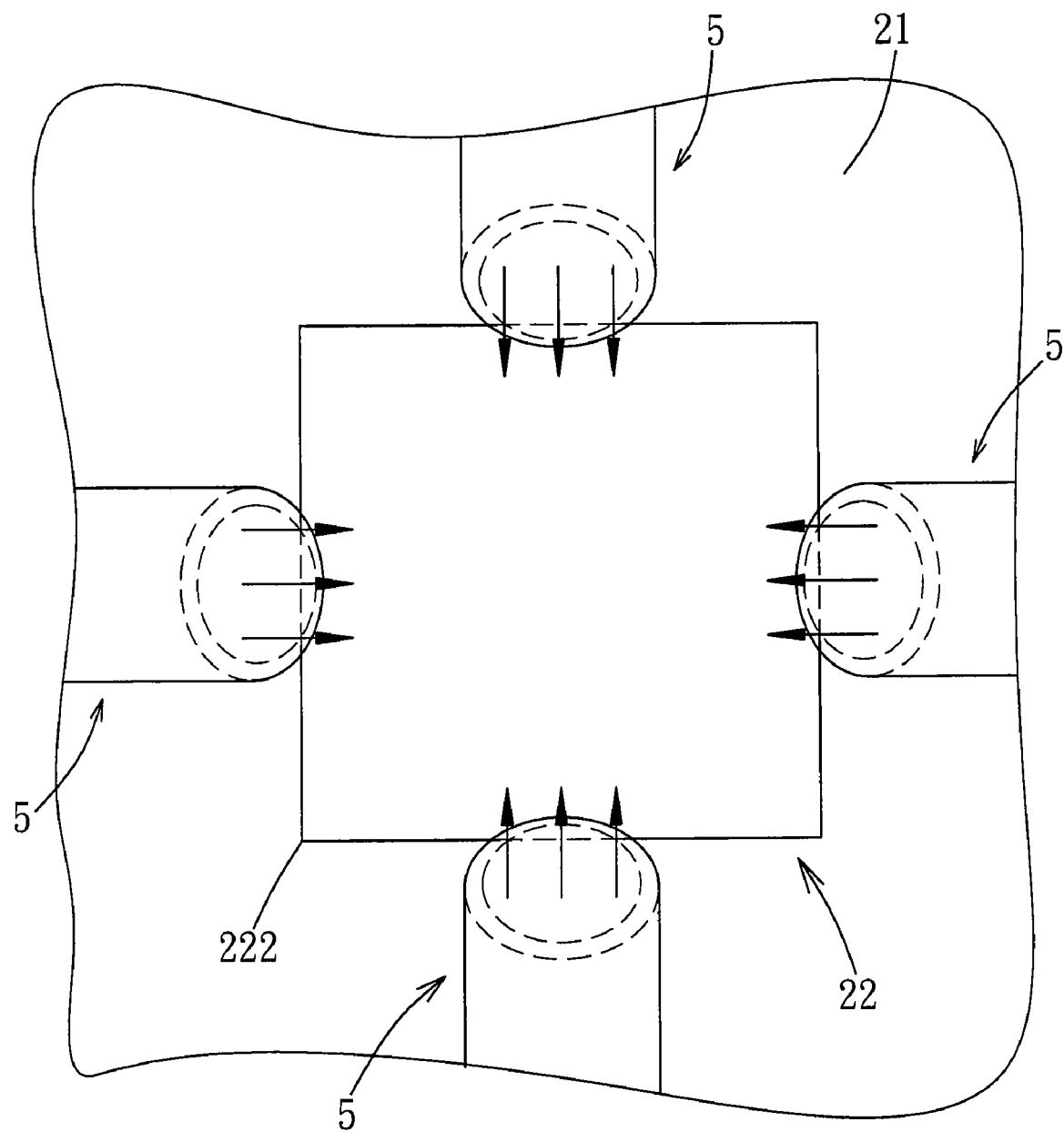
FIG. 26 is a fragmentary schematic top view of the fourth preferred embodiment of the heat conducting apparatus according to the present invention and the circuit board, illustrating that the flexible devices are bent and disposed at positions corresponding to side edges of an outer peripheral wall of the soldered component.

Reference is made to FIGS. 24, 25, and 26. FIG. 24 is a flowchart of the solder melting method for the heat conducting apparatus 330.

In step 91, the flexible tubes 51 are bent so that the flexible tubes 51 are disposed at positions corresponding to the tin solders 23 between the circuit board 21 and the soldered component 22. Since the soldered component 22 is generally rectangular, and due to the arrangement of the four flexible devices 5, each of the flexible devices 5 can correspond in position to the tin solder 23 between a respective side edge of the outer peripheral wall 222 of the soldered component 22 and the circuit board 21 after being bent.

In step 92, hot air is introduced, which flows through the flexible tubes 51 to the tin solders 23 to melt the latter. Through the flexible devices 5 that guide the hot air to the tin solder 23 between each side edge of the outer peripheral wall 222 and the circuit board 21, the tin solders 23 at the side edges of the outer peripheral wall 222 can be melted simultaneously.

In step 93, the soldered component 22 is removed and separated from the circuit board 21. Specifically, after all the tin solders 23 have been melted by the hot air flowing out of the flexible devices 5, the soldered component 22 can be removed from the circuit board 21. Through use of the flexible devices 5 that can be bent and disposed at adjusted angular positions, the operator can control the flowing directions of the hot air coming out through the flexible devices 5 with precision, so that the electronic components 24 around the soldered component 22 will not be heated and melted by the hot air to avoid damage to the electronic components 24, and the tin pastes 25 will not be melted to avoid loosening of the electronic components 24.

Referring to FIG. 27, after the soldered component 22 has been removed, the heat conducting apparatus 330 can be used to heat the tin solders 27 (solder balls) of a soldered component 26' (BGA chip) to be repaired that was covered by the soldered component 22. After the flexible devices 5 are bent to correspond to the positions of the tin solders 27, the flexible devices 5 can guide the hot air to the tin solders 27 to melt the same. After the tin solders 27 are completely melted, the soldered component 26' to be repaired can be removed from the circuit board 21 for repair or replacement. During the process of heating and melting the tin solders 27, the hot air will not heat and melt the electronic component 24 and the good soldered component 26 around the soldered component 26' to be repaired to avoid damage thereto, and the hot air will not melt the tin paste 25 of the electronic component 24 and the tin solders 27 of the good soldered component 26 to avoid loosening of the same.

Referring to FIGS. 28 and 29, the fifth preferred embodiment of a heat conducting apparatus 340 according to the present invention is substantially the same as the fourth preferred embodiment in terms of the solder melting method employed therefor. The difference resides in that the heat conducting apparatus 340 of this embodiment further includes a plurality of air delivering devices 7 that are respectively disposed at bottom ends of the flexible devices 5.

Each of the air delivering devices 7 is made from a metal material, and includes a cylindrical casing 71, and an elongated casing 72 disposed at a bottom end of the cylindrical casing 71. Through an external thread 711 which is disposed on an outer surface of the cylindrical casing 71 adjacent to a top end thereof and which is connected threadedly to a lower internal thread 513 disposed on an inner surface of a respective one of the flexible tubes 51 adjacent to a bottom end thereof, each of the air delivering devices 7 can be assembled detachably to the respective one of the flexible tubes 51. The elongated casing 72 of each of the air delivering devices 7 has a bottom end that defines an elongated air outlet 721 for exit of hot air flowing along the respective flexible device 5.

Figure 31:
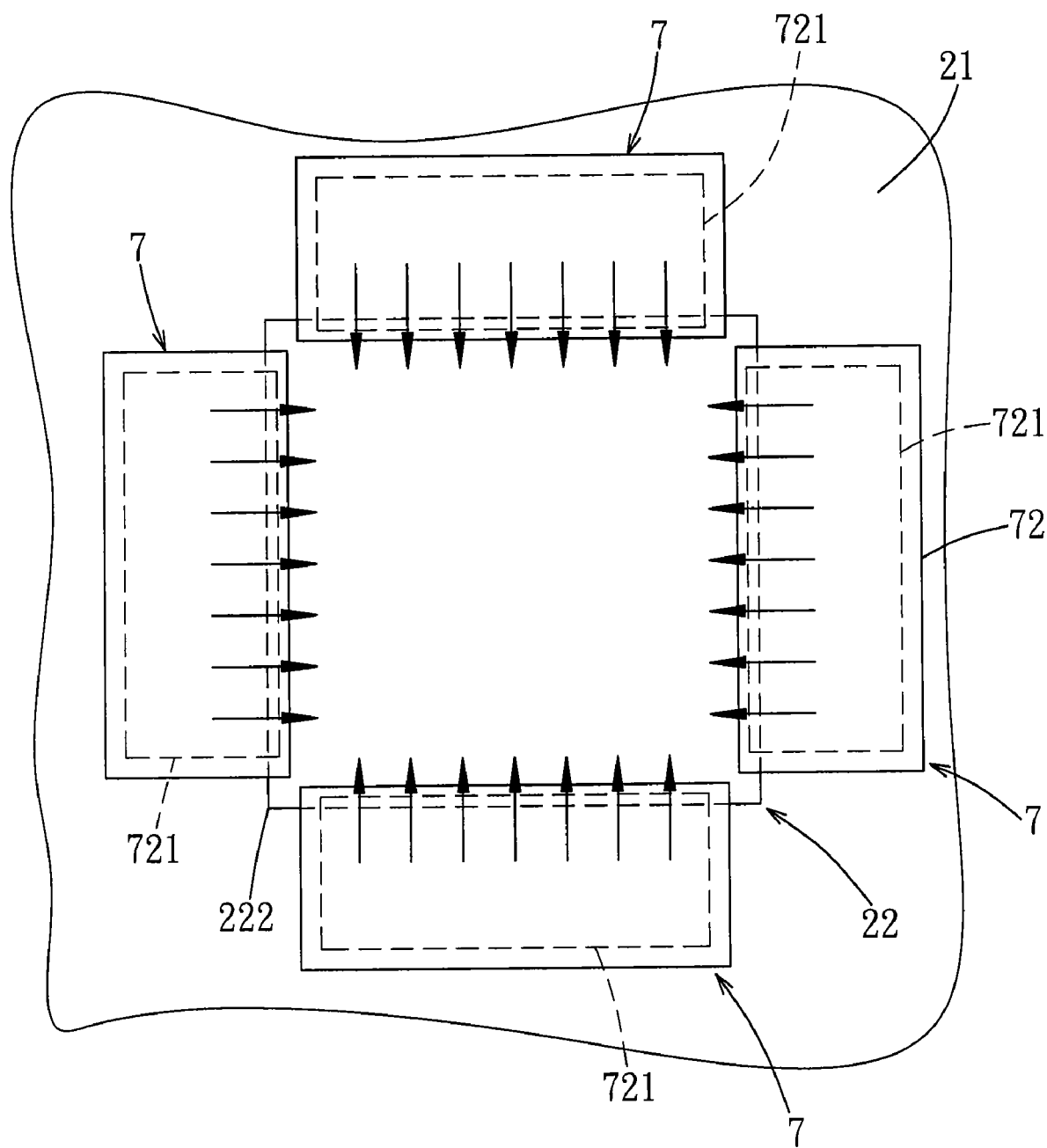
FIG. 31 is a fragmentary schematic top view of the fifth preferred embodiment of the heat conducting apparatus according to the present invention and the circuit board, illustrating that the flexible devices are bent and positioned such that the elongated air outlets of the air delivering devices correspond to side edges of an outer peripheral wall of the soldered component.

Referring to FIGS. 30 and 31, each of the flexible devices 5 can be bent by the operator such that the elongated air outlet 721 of the respective air delivering device 7 corresponds to the tin solder 23 between one of the side edges of the outer peripheral wall 222 of the soldered component 22 and the circuit board 21. Since the length of the elongated air outlet 721 of each of the air delivering devices 7 is the same or almost the same as that of the side edges of the outer peripheral wall 222, through the elongated air outlets 721 that permit the hot air to flow to the tin solders 23, the tin solders 23 at the side edges can be uniformly heated and melted, thereby avoiding occurrence of such instances where some of the tin solders 23 cannot be sufficiently heated for melting the same due to uneven supply of hot air thereto. After the tin solders 23 have been completely melted, the soldered component 22 can be removed from the circuit board 21.

Figure 32:
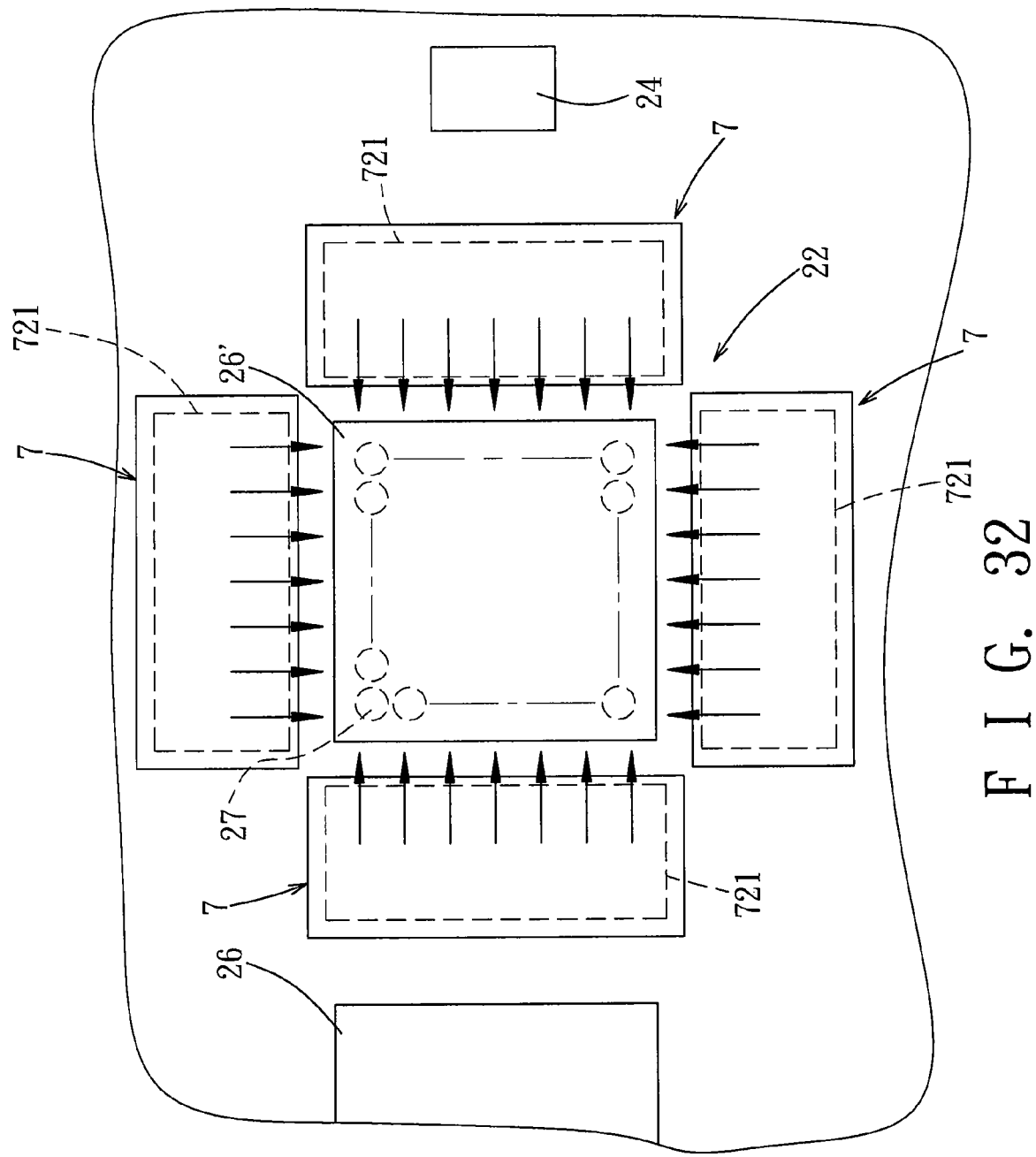
FIG. 32 is another fragmentary schematic top view of the fifth preferred embodiment of the heat conducting apparatus according to the present invention and the circuit board, illustrating that the flexible devices are bent and positioned such that the rectangular out lets of the air delivering devices correspond to positions of tin solders between the circuit board and another soldered component so as to guide the hot air to the tin solders to heat the same.

Referring to FIG. 32, after the soldered component 22 is removed, the heat conducting device 340 can be used to heat the tin solders 27 (solder balls) of the soldered component 26' (BGA chip) to be repaired that was covered by the soldered component 22. The flexible devices 5 are bent so that the elongated air outlets 721 of the air delivering devices 7 correspond in position to the tin solders 27. The elongated air outlets 721 of the air delivering devices 7 can then guide the hot air to the tin solders 27 for melting the same. After the tin solders 27 are completely melted, the soldered component 26' to be repaired can be removed from the circuit board 21 for repair or replacement.

In summary, with the arrangement of the heat conducting devices 4, 4', 4" of the heat conducting apparatus 300, 310, 320 to heat the soldered component 22, 22' by heat conduction, or with the configuration of the flexible devices 5 of the heat conducting apparatus 330, 340 that can be bent and disposed at adjusted angular positions, the hot air can be guided to the tin solders 23, 27 between the soldered component 22 or 26' and the circuit board 21 to heat and melt the tin solders 23, 27, thereby reducing any adverse effect on the electronic components 24 or the good soldered component(s) 26 on the circuit board 21.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A heat conducting apparatus for hot-melting tin solders between a circuit board and a soldered component, said heat conducting apparatus comprising:
   an air guide hood to be connected to a hot air supply source for delivering hot air, said air guide hood including at least one air outlet for exit of the hot air; and
   at least one heat conducting device disposed at said air outlet of said air guide hood, said heat conducting device including a contact wall spaced apart from and disposed below said air outlet for contacting the soldered component, and a surrounding wall extending upwardly from an outer periphery of said contact wall and having one end that is connected to said air guide hood and that surrounds said air outlet, said contact wall and said surrounding wall cooperatively defining a flow guiding space for guiding flow of the hot air, said contact wall being disposed to conduct heat to the soldered component to melt the tin solders between the soldered component and the circuit board.

2. The heat conducting apparatus of claim 1, wherein said surrounding wall is a flexible tube which is bendable to be disposed at a desired adjusted angular position, said contact wall being connected detachably to said surrounding wall.

3. The heat conducting apparatus of claim 2, wherein said heat conducting device further includes a first heat insulating tube sleeved around an outer surface of said surrounding wall.

4. The heat conducting apparatus of claim 3, wherein said heat conducting device further includes a second heat insulating tube disposed to be surrounded by an inner surface of said surrounding wall.

5. The heat conducting apparatus of claim 4, wherein said contact wall includes a threaded portion connected threadedly to said surrounding wall, and a contact portion projecting from a bottom face of said threaded portion for contacting the soldered component, said heat conducting device further including a magnet that is attached to an outer peripheral face of said contact portion by magnetic attraction for attracting the soldered component thereto.

6. The heat conducting apparatus of claim 5, further comprising a flexible device, said flexible device including a flexible tube connected detachably to said air outlet at a bottom end of said air guide hood, said surrounding wall of said heat conducting device being sleeved detachably around and being spaced apart from an outer periphery of said flexible tube, said flexible tube having a bottom end spaced apart from said contact wall, said surrounding wall including a plurality of air discharge holes that communicate said flow guiding space with an ambient surrounding for discharging the hot air in said flow guiding space.

7. The heat conducting apparatus of claim 6, wherein said first heat insulating tube includes a plurality of first through holes corresponding respectively to said air discharge holes in position and number, said second heat insulating tube including a plurality of second through holes that correspond respectively to said air discharge holes in position and number.

8. The heat conducting apparatus of claim 6, wherein said air guide hood includes a peripheral wall projecting from a bottom face thereof and disposed at an outer periphery of said air outlet, said flexible tube being connected threadedly to an outer surface of said peripheral wall, said surrounding wall being connected threadedly to an outer surface of said flexible tube adjacent to a top end thereof.

9. The heat conducting apparatus of claim 2, further comprising a flexible device, said flexible device including a flexible tube connected detachably to said air outlet at a bottom end of said air guide hood, said surrounding wall of said heat conducting device being sleeved detachably around and being spaced apart from an outer periphery of said flexible tube, said flexible tube having a bottom end spaced apart from said contact wall, said surrounding wall including a plurality of air discharge holes that communicate said flow guiding space with an ambient surrounding for discharging the hot air in said flow guiding space.

10. The heat conducting apparatus of claim 9, wherein said contact wall includes a threaded portion connected threadedly to said surrounding wall, and a contact portion projecting from a bottom face of said threaded portion for contacting the soldered component, said heat conducting device further including a magnet that is attached to an outer peripheral face of said contact portion by magnetic attraction for attracting the soldered component thereto.

11. The heat conducting apparatus of claim 9, wherein said heat conducting device further includes a first heat insulating tube sleeved around an outer surface of said surrounding wall, said first heat insulating tube including a plurality of first through holes corresponding respectively to said air discharge holes in position and number.

12. The heat conducting apparatus of claim 11, wherein said heat conducting device further includes a second heat insulating tube disposed to be surrounded by an inner surface of said surrounding wall, said second heat insulating tube including a plurality of second through holes that correspond respectively to said air discharge holes in position and number, each of said first heat insulating tube and said second heat insulating tube being a fiberglass tube.

13. The heat conducting apparatus of claim 5, wherein said air guide hood includes a peripheral wall projecting from a bottom face thereof and disposed at an outer periphery of said air outlet, said surrounding wall being connected threadedly to an outer surface of said peripheral wall.

14. The heat conducting apparatus of claim 1, wherein said air guide hood includes a hood body, and an air hole device assembled detachably to a bottom end of said hood body and having said air outlet, said surrounding wall including a wall body connected to said contact wall and extending through said air outlet, and an engaging ring projecting radially outward from an outer surface of said wall body and disposed adjacent to a top end of said wall body for engaging a top face of said air hole device.

15. The heat conducting apparatus of claim 14, wherein said wall body has an outer diameter smaller than a diameter of said air outlet, said engaging ring having an outer diameter greater than the diameter of said air outlet.

16. The heat conducting apparatus of claim 1, wherein said air guide hood includes a plurality of said air outlets disposed in a bottom end thereof for exit of the hot air, said heat conducting apparatus comprising a plurality of said heat conducting devices and a plurality of covers, each of said heat conducting devices being selectively disposed at a respective one of said air outlets to conduct heat to the soldered component, each of said covers selectively covering a respective one of said air outlets that is not provided with one of said heat conducting devices.

* * * * *